United States Patent [19]

Wakui et al.

[11] Patent Number: 4,900,804
[45] Date of Patent: Feb. 13, 1990

[54] AROMATIC POLYESTERS, POLYESTERAMIDES, AND COMPOSITIONS THEREOF

[75] Inventors: Tadahiro Wakui; Kenji Yoshino; Masafumi Komatsu; Yumiko Kumazawa; Touru Yamagishi; Mitsuhiko Izumi, all of Chiba, Japan

[73] Assignee: Kawasaki Steel Corporation, Hyogo, Japan

[21] Appl. No.: 335,675

[22] Filed: Apr. 10, 1989

Related U.S. Application Data

[62] Division of Ser. No. 135,558, Dec. 17, 1987, Pat. No. 4,851,497.

[30] Foreign Application Priority Data

Dec. 19, 1986 [JP] Japan ................................ 61-303228
Dec. 22, 1986 [JP] Japan ................................ 61-305874

[51] Int. Cl.$^4$ ............................................. C08G 69/26
[52] U.S. Cl. .................................... 528/332; 528/176; 528/179; 528/193; 528/219; 528/271; 524/601; 524/602; 524/604; 524/607
[58] Field of Search ............... 528/332, 335, 339, 344, 528/348, 176, 179, 193, 219, 271; 524/601, 602, 604, 607

[56] References Cited

U.S. PATENT DOCUMENTS

| | | | |
|---|---|---|---|
| 3,637,595 | 1/1972 | Cottis et al. | 528/193 |
| 4,067,852 | 1/1978 | Calundann | 528/190 |
| 4,169,933 | 10/1979 | Jackson, Jr. et al. | 528/190 |
| 4,330,457 | 5/1982 | East et al. | 524/602 |
| 4,337,191 | 6/1982 | Favstritsky | 524/599 |
| 4,339,375 | 7/1982 | Calundann et al. | 524/602 |
| 4,341,688 | 7/1981 | Charbonneau et al. | 524/592 |
| 4,351,917 | 9/1982 | Calundann et al. | 524/602 |
| 4,351,918 | 9/1982 | Charbonneau et al. | 524/602 |
| 4,355,132 | 10/1982 | East et al. | 524/602 |
| 4,851,497 | 7/1989 | Wakui et al. | 528/176 |

Primary Examiner—Morton Foelak
Assistant Examiner—Samuel A. Acquah
Attorney, Agent, or Firm—Young & Thompson

[57] ABSTRACT

An aromatic polyester consisting of 40–70 mol % of unit I derived from p-hydroxybenzoic acid, 1–8 mol % of unit II derived from m-hydroxybenzoic acid or isophthalic acid, 6–36 mol % of units III and IV derived from terephthalic acid and 2,6-naphthalene dicarboxylic acid, respectively, and 10–40 mol % of unit V derived from a symmetrical dihydroxy compound can be melt molded at a temperature of up to 330° C. into an article having improved mechanical and thermal properties. An aromatic polyesteramide consisting of components I to V and unit VI having an anilino group is also provided. A filled composition is obtained by blending the polyester or polyesteramide with an inorganic filler. A magnetic resin composition is obtained by blending the polyester or polyesteramide with a magnetic powder.

6 Claims, 4 Drawing Sheets

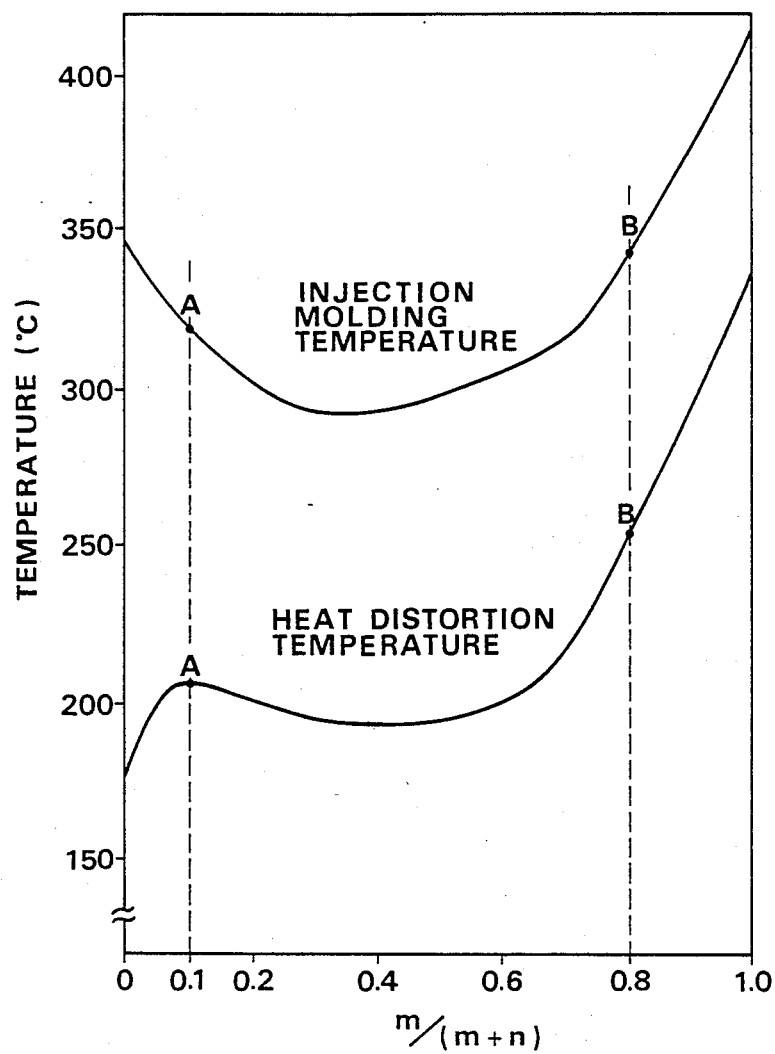
F I G. 1

AROMATIC POLYESTERS, POLYESTERAMIDES, AND COMPOSITIONS THEREOF

This application is a division, of application Ser. No. 135,558, filed 12/17/87 now U.S. Pat. No. 4,851,497.

BACKGROUND OF THE INVENTION

This invention relates to a novel aromatic polyester, a novel aromatic polyesteramide, and compositions thereof.

In these years, there is an increasing need for polymeric materials having not only excellent mechanical properties such as tensile strength and modulus, but also excellent heat resistance and chemical resistance. One type of polymeric material satisfying such a requirement is a class of liquid crystalline polyester and polyesteramide which is easy to polymerize and mold and has excellent mechanical properties because of molecule orientation.

All aromatic polyesters are widely known as liquid crystalline polyesters. For example, homopolymers and copolymers of p-hydroxybenzoic acid have been commercially produced and marketed. Some of these all aromatic polyesters, however, cannot be melt molded because their melting point is too high, and others are difficult to mold because their melt viscosity is high.

It was proposed to produce aromatic polyesters having a lower melting point by copolymerizing various components with p-hydroxybenzoic acid. Examples of prior art p-hydroxybenzoic acid copolymers are listed below by referring to the patents disclosing them.

(1) Japanese Patent Application Kokai No. 54-139698

Copolymers of p-hydroxybenzoic acid with isophthalic acid and hydroquinone have a higher melting point.

(2) U.S. Pat. No. 3,637,595

Copolymers of p-hydroxybenzoic acid with terephthalic acid, isophthalic acid, and an aromatic dihydroxy compound such as hydroquinone are highly heat resistant and provide a molded article having high strength. But the melt molding temperature is extremely high.

(3) U.S. Pat. No. 4,067,852

Aromatic polyesters are prepared by copolymerizing p-hydroxybenzoic acid, 2,6-naphthalene dicarboxylic acid, and an aromatic dihydroxy compound.

(4) U.S. Pat. No. 4,169,933 (Japanese Patent Application Kokai No. 54-30290)

Aromatic polyesters are prepared by copolymerizing p-hydroxybenzoic acid, 2,6-naphthalene dicarboxylic acid, terephthalic acid, and hydroquinone.

(5) U.S. Pat. No. 4,083,829

Aromatic polyesters are prepared by copolymerizing p-hydroxybenzoic acid, 2,6-naphthalene dicarboxylic acid, isophthalic acid or resorcin, and an aromatic dihydroxy compound.

(6) U.S. Pat. No. 4,130,545

Aromatic polyesters are prepared by copolymerizing p-hydroxybenzoic acid, 2,6-naphthalene dicarboxylic acid, m-hydroxybenzoic acid, and an aromatic dihydroxy compound.

These aromatic polyesters (3) through (6) have a relatively low melting point so that they are melt moldable. Some polyesters are said to be spun into a filament having a strength of the order of 6 to 10 grams/denier. These polyesters suffer from a relatively low heat distortion temperature.

Among aromatic copolyesters available in the prior art, certain copolymers are heat resistant, but cannot be molded or can be molded with difficulty because the heat resistance is accompanied with a high melting or flow temperature. Some copolymers are difficult to mold because the melt viscosity is increased despite the degree of polymerization of copolyesters. Some other copolymers contain infusible particulates after polymerization and suffer from poor moldability. Conversely, those copolymers characterized by good moldability because of a low melting or flow temperature are not fully heat resistant.

Although the melting temperature of a resin is desired to be lower for ease of molding, a resin having a lower melting temperature exhibits lower heat resistance too. Ideally speaking, a resin is desired to have as high a heat resistance and as low a melting temperature as possible.

Liquid crystalline polyesteramides are modified polyesters in which amide bonds are incorporated in addition to ester bonds for the purpose of improving the adhesion, fatigue resistance and anisotropy of liquid crystalline polyesters. They are disclosed in a number of patents, for example, Japanese Patent Application Kokai Nos.

| | | |
|---|---|---|
| 57-137321 | 57-145123, | 57-172921, |
| 57-177019, | 57-177020, | 57-177021, |
| 58-01722, | 58-29820, | 58-89618, |
| 61-051032 | 61-236819, | 61-236826, |
| 61-236827. | | |

Liquid crystalline polyesteramides do not have a marked drawback as described below which is common in liquid crystalline polyesters.

Liquid crystalline polyester has the nature known as anisotropy that the strength of a melt molded resin in a machine or oriented direction (MD) is substantially different from that in a transverse direction (TD). Since rupture of an injection molded part by an external force generally takes place at the weakest site, cracks occur in a molded part of liquid crystalline polyester in its transverse direction (TD). To improve the practical strength of liquid crystalline polyester, the anisotropy thereof must be mitigated, that is, the TD strength thereof must be increased.

As to aromatic polyesters, they have drawbacks common to liquid crystalline polyesters as previously described. More particularly, aromatic polyesters exhibit outstanding anisotropy with respect to mechanical strength, coefficient of linear expansion, and mold shrinkage factor and tend to be marred on the surface. Improvements in these points are desired. A new approach for eliminating the anisotropy and marring of aromatic polyesters is also desired.

Plastic magnets or magnetic resin compositions are inferior in magnetic characteristics to sintered magnets, but have the advantages that a number of products can be readily obtained by injection molding, and they are lightweight and can have a complicated shape. Plastic magnets include magnetic powder and binder resins which are usually epoxy resins and polyamide resins such as nylon-6 and nylon-66. Therefore, the mechanical strength and heat resistance of plastic magnets depend on the particular type of resin used as the binder. For example, plastic magnets based on heat resistant epoxy resins have a heat distortion temperature of from 100° to 120° C. and magnets based on nylon have a heat distortion temperature of from 140° to 160° C.

In order that magnetic resin compositions may find a wider variety of applications, it is important to increase the heat resistance of the compositions. In general, a composition comprising a more heat resistant resin are more difficult to mold, losing the advantage of magnetic resin compositions that a number of parats can be obtained and can have a complicated shape.

It is also desired that magnetic resin compositions having high moldability and heat resistance be mitigated in anisotropy and improved in mechanical strength.

SUMMARY OF THE INVENTION

Therefore, A first object of the present invention is to provide a novel and improved aromatic polyester which is characterized by improved heat resistance, moldability, mechanical strength, flame retardancy, chemical resistance, solvent resistance, appearance, low coefficient of linear expansion, and low mold shrinkage factor, and which is easily molded by injection.

A second object of the present invention is to provide a novel and improved aromatic polyesteramide in which the aromatic polyester capable of attaining the first object is modified to mitigate its anisotropy without sacrificing the remaining characteristics.

A third object of the present invention is to provide a novel aromatic polyester composition which is characterized by improved heat resistance, moldability, mechanical strength, flame retardancy, chemical resistance, solvent resistance, appearance, low coefficient of linear expansion, low mold shrinkage factor, ease of injection molding, mitigated anisotropy, and improved mar resistance.

A fourth object of the present invention is to provide a novel aromatic polyesteramide composition in which the aromatic polyester composition capable of attaining the third object is modified to mitigate its anisotropy without sacrificing the remaining characteristics.

A fifth object of the present invention is to provide a novel magnetic resin composition comprising an aromatic polyester binder and having improved moldability, heat resistance, strength and modulus.

A sixth object of the present invention is to provide a novel magnetic resin composition comprising an aromatic polyesteramide binder and having improved moldability, heat resistance, strength and modulus.

We have discovered that these objects can be attained by copolymerizing p-hydroxybenzoic acid, m-hydroxybenzoic acid or isophthalic acid, terephthalic acid, 2,6-naphthalene dicarboxylic acid, and 4,4'-dihydroxybiphenyl in a specific proportion to form a copolyester.

According to a first aspect of the present invention, there is provided an aromatic polyester consisting essentially of units I, II, III, IV, and V of the following formulae:

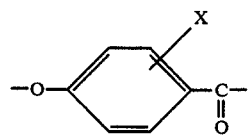   I

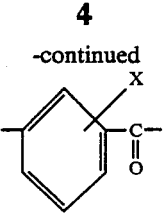   II

   III

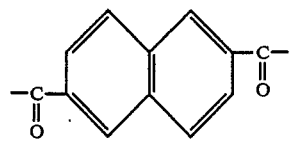   IV wherein
X is a radical selected from the group consisting of a hydrogen atom, a halogen atom, an alkyl radical having 1 to 4 carbon atoms, an alkoxy radical having 1 to 4 carbon atoms, and an aryl radical having 6 to 10 carbon atoms,
—O—Ar—O— is a symmetrical dioxy unit having at least one aromatic ring of a single ring or fused ring structure, and
Y is —O— or

in the following molar amounts:

| unit I | 40 to 70 mol %, |
|---|---|
| unit II | 1 to 8 mol %, |
| units III + IV | 6 to 36 mol %, |
| unit V | 10 to 40 mol %, | with the molar ratio of unit III/(units III+IV) ranging from 1/10 to 8/10.

According to a second aspect of the present invention, there is provided an aromatic polyesteramide consisting essentially of units I, II, III, IV, V, and VI of the following formulae:

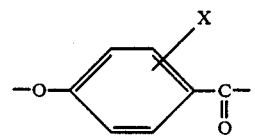   I

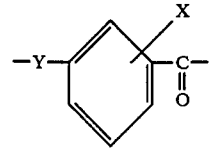   II

   III

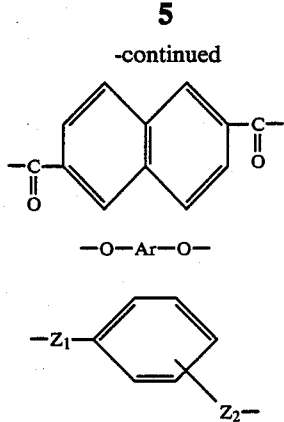

wherein
X is a radical selected from the group consisting of a hydrogen atom, a halogen atom, an alkyl radical having 1 to 4 carbon atoms, an alkoxy radical having 1 to 4 carbon atoms, and an aryl radical having 6 to 10 carbon atoms, —O—Ar—O— is a symmetrical dioxy unit having at least one aromatic ring of a single ring or fused ring structure, Y is —O— or

$Z_1$ is —NH—, and
$Z_2$ is —NH—, —O— or

$Z_1$ and $Z_2$ are in para or meta relation to each other, in the following molar amounts:

| | |
|---|---|
| unit I | 40 to 70 mol %, |
| unit II | 1 to 8 mol %, |
| units III + IV | 6 to 36 mol %, |
| unit V | 10 to 40 mol %, |
| unit VI | 0.1 to 10 mol %, | with the molar ratio of unit III/(units III+IV) ranging from 1/10 to 8/10.

According to a third aspect of the present invention, there is provided an aromatic polyester composition comprising an aromatic polyester according to the first aspect and an effective amount of an inorganic filler.

According to a fourth aspect of the present invention, there is provided an aromatic polyesteramide composition comprising an aromatic polyesteramide according to the second aspect and an effective amount of an inorganic filler.

According to a fifth aspect of the present invention, there is provided a magnetic resin composition comprising an aromatic polyester according to the first aspect and an effective amount of a magnetic powder.

According to a sixth aspect of the present invention, there is provided a magnetic resin composition comprising an aromatic polyesteramide according to the second aspect and an effective amount of a magnetic powder.

BRIEF DESCRIPTION OF THE DRAWINGS

The invention will be more fully understood by reading the following description taken in conjunction with the accompanying drawings, in which:

FIGS. 1 to 6 are diagrams showing the results of measurements on the resins and compositions of Examples and Comparative Examples.

DETAILED DESCRIPTION OF THE INVENTION

Figure 2:
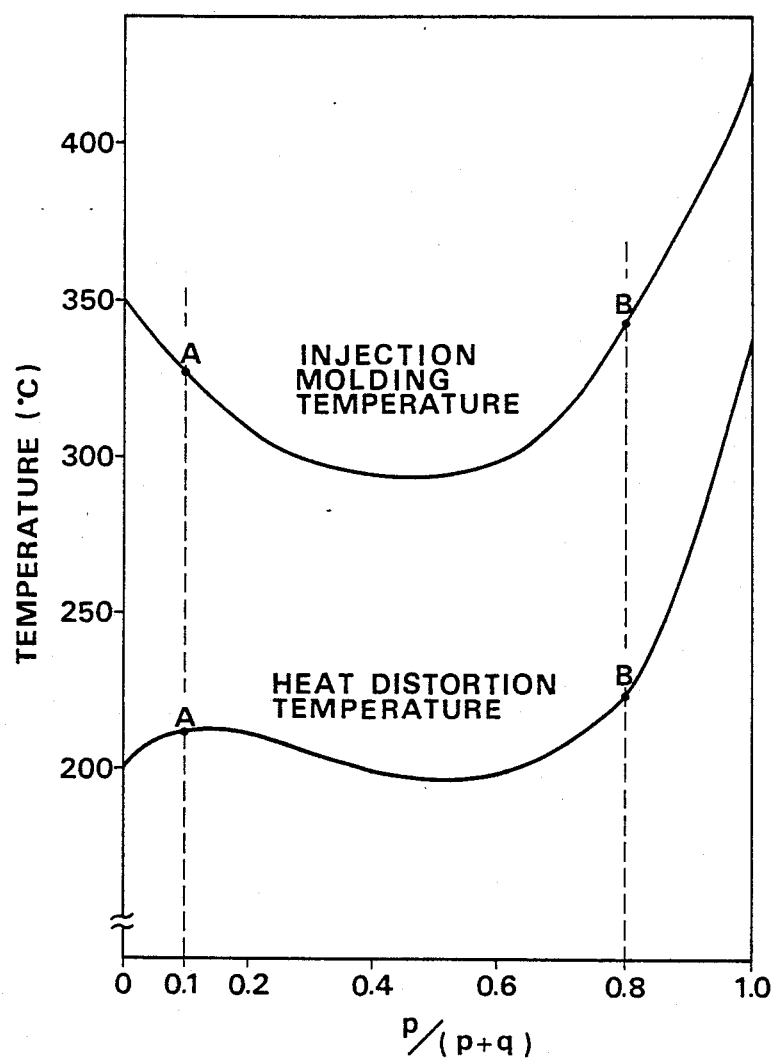

[1] The aromatic polyester according to the first aspect of the present invention consists essentially of units (I) through (V) as defined above. Units (I) through (V) are described in further detail.

Unit (I) is derived from p-hydroxybenzoic acid. Also included are p-hydroxybenzoic acid derivatives in which the benzene nucleus is substituted with a $C_1$-$C_4$ alkyl, a $C_1$-$C_4$ alkoxy, a $C_6$-$C_{10}$ aryl, or a halogen atom, preferably chloro or bromo. Typical examples of the preferred compounds from which unit (I) is derived include unsubstituted p-hydroxybenzoic acid and ester-forming derivatives thereof such as acetate, propionate, benzoate, methyl, ethyl and phenyl derivatives.

Unit (I) is contained in an amount of from about 40 to about 70 mol%, preferably from about 45 to about 65 mol%. Outside this range, the polyester shows poor mechanical strength.

Unit (II) is an isophthaloyl unit represented by the following formula (II-i) and/or a m-hydroxybenzoic acid unit represented by the following formula (II-ii).

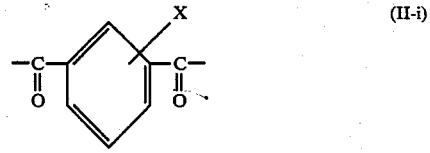

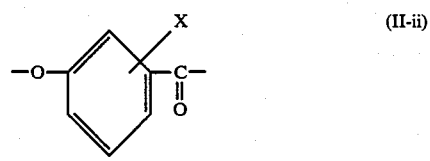

The benzene nucleus of units (II-i) and (II-ii) may be substituted with a $C_1$-$C_4$ alkyl, a $C_1$-$C_4$ alkoxy, a $C_6$-$C_{10}$ aryl, or a halogen atom, preferably chloro or bromo.

Unit (II-i) is an isophthaloyl unit. It may be derived from isophthalic acid and mono- or diester deriatives thereof with methyl, ethyl and phenyl, and a mixture thereof.

Unit (II-ii) is a m-hydroxybenzoic acid unit. It may be derived from m-hydroxybenzoic acid and mono- or diester derivatives thereof with acetate, propionate, benzoate, methyl, ethyl and phenyl.

Unit (II) which is actually unit (II-i) and/or (II-ii) is contained in an amount of from about 1 to about 8 mol%, preferably from about 2 to about 5 mol%. With less than about 1 mol% of unit (II), the resulting polyester exhibits a higher flow temperature and is thus rather difficult to mold. When the content of unit (II) in the polyester exceeds about 8 mol%, the heat resistance of the resulting polyester is lowered.

Units (III) and (IV) are derived from terephthalic acid and 2,6-naphthalene dicarboxylic acid, respectively. Mono- or diester derivatives of terephthalic acid and 2,6-napthalene dicarboxylic acid with methyl, ethyl and phenyl are also included.

The combined content of unit (III) plus unit (IV) ranges from about 6 to about 36 mol%, preferably from about 12 to about 27 mol%. With a combined content of less than 6 mol%, the resulting polyester has a too high flow temperature to mold with ease. A copolyester having a combined content of units (III) and (IV) in excess of 36 mol% tends to be colored and loses mechanical strength.

The molar ratio between units(III) and (IV) as expressed by (III)/(III+IV) ranges from about 1/10 to about 8/10, preferably from about 3/10 to 7/10. With molar ratios outside this range, the resulting polyester exhibits a higher flow temperature and is thus difficult to mold. Heat resistance is lacking at a molar ratio of less than 1/10.

This limitation of molar ratio III/(III+IV) is derived by preparing (II-i)-containing aromatic polyesters having the following units in a varying ratio III/(III+IV) referred to as m/(m+n), determining the injection molding temperature (IMT) and heat distortion temperature (HDT) thereof, and plotting the data in FIG. 1 as will be later described in Examples.

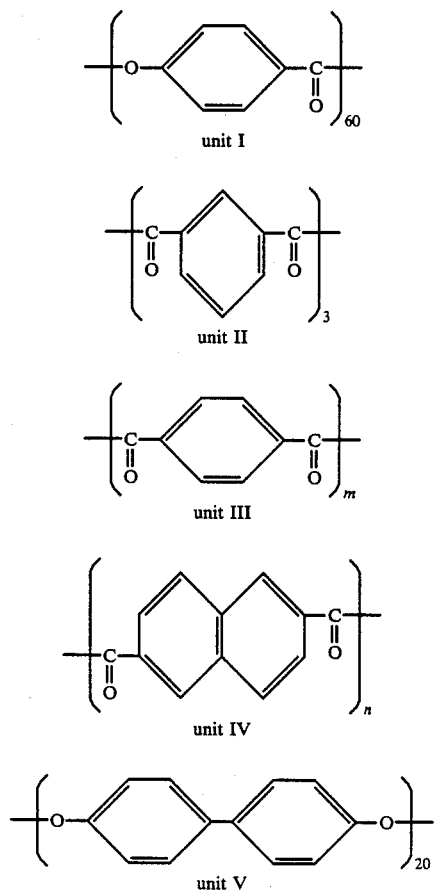

The limitation of the molar ratio is also derived by preparing (II-ii)-containing aromatic polyesters having the following units in a varying ratio III/(III+IV) referred to as p/(p+q), determining the injection molding temperature (IMT) and heat distortion temperature (HDT) thereof, and plotting the data in FIG. 2 as will be later described in Examples.

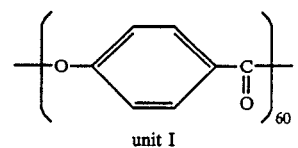
unit I

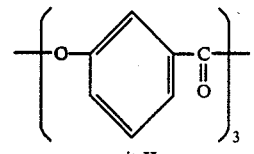
unit II

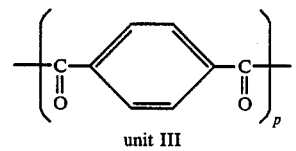
unit III

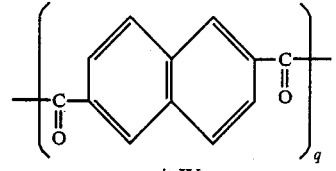
unit IV

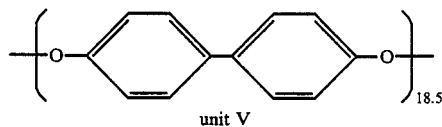
unit V

As seen from FIGS. 1 and 2, a polyester with a ratio III/(III+IV) of less than 1/10 has a low heat distortion temperature and an elevated injection molding temperature. A polyester with a ratio III/(III+IV) of more than 8/10 has a high heat distortion temperature, but its injection molding temperature is too high to mold.

With a ratio III/(III+IV) in the range of from 3/10 to 7/10, the present aromatic polyester exerts its advantageous characteristics to a full extent in that it has a high heat distortion temperature despite a low injection molding temperature and these temperatures experience only a little change with a varying composition.

Unit (V) is derived from a symmetrical dihydroxy compound represented by the formula: HO—Ar—OH wherein Ar is a divalent radical consisting of at least one aromatic ring. Unit (V) is contained in an amount of from about 10 to about 40 mol%, preferably from about 17.5 to about 27.5 mol%. The symmetrical dihydroxy compounds which can be used in the preparation of the all aromatic polyesters of the present invention include those compounds which form the following units in the copolyesters.

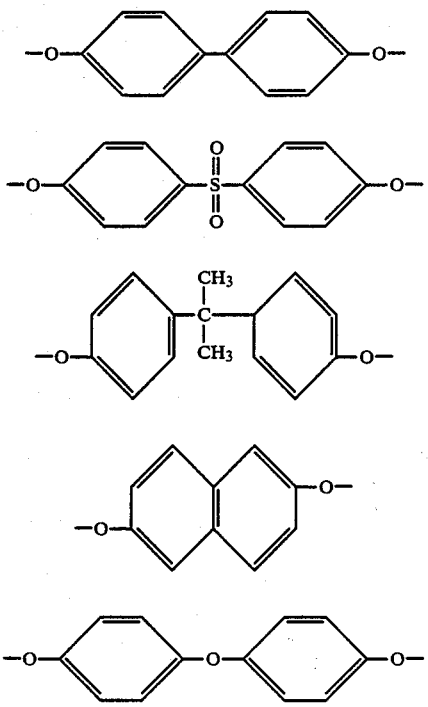

Examples of the symmetrical dihydroxy compound include hydroquinone, bisphenol-A, 4,4'-dihydroxybiphenyl, dihydroxybiphenyl ether, and 2,6-dihydroxynaphthalene, and mono- and diester derivatives thereof such as acetates, propionates and benzoates. Most preferred are 4,4'-dihydroxybiphenyl and 2,6-dihydroxynaphthalene.

With less than 10 mol% of unit (V), the resulting polyester exhibits a higher flow or melt molding temperature and is thus difficult to mold. More than 40 mol% of unit (V) will undesirably affect the heat resistance of the polyester.

[2] The aromatic polyesteramide according to the second aspect of the present invention consists essentially of units (I) through (VI) as defined above.

The aromatic polyesteramide includes unit (VI) in addition to units (I) through (V) previously described in connection with the aromatic polyester. Units (I) through (V) are the same as previous with respect to their structure and content.

Unit (VI) is a unit having an anilino or phenylamino group and represented by the following formula:

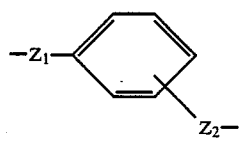

wherein $Z_1$ is —NH—, and $Z_2$ is —NH—, —O— or

$Z_1$ and $Z_2$ are in para or meta relation to each other.

Unit (VI) should be present in an amount of from about 0.1 to about 10 mol%, preferably from about 1 to about 8 mol%, based on the total mols of units (I) through (VI). Less than 0.1 mol% of unit (VI) is ineffective to mitigate the anisotropy of the polyester by incorporating an amide group. More than 10 mol% of unit (VI) results in a high melting temperature and an increased melt viscosity, and thus adversely affects moldability, heat resistance, and mechanical strength.

The aromatic polyesteramide according to the second aspect of the present invention has moderated the anisotropy of the aromatic polyester according to the first aspect of the present invention without sacrificing the remaining characteristics of the polyester. The polyesteramide thus has a high strength in a direction (TD) perpendicular to an orienting direction given during melt molding.

[3] The composition according to the third aspect of the present invention is a composition comprising an aromatic polyester as defined in [1] and an effective amount of an inorganic filler.

The inorganic fillers used herein include talc, calcium carbonate including heavy, light and sol forms, mica, barium sulfate, calcium silicate, clay, magnesium carbonate, wollastonite, alumina, silica, iron oxide, calcium sulfate, glass fibers, glass beads, glass powder, glass microbaloons, white carbon, silica sand, quartzite, carbon black, aluminum hydroxide, magnesium hydroxide, calcium hydroxide, zinc oxide, white lead, basic magnesium carbonate, asbestos, zeolite, molybdenum, titanium oxide, diatomaceous earth, sericite, sirasu, graphite, calcium sulfite, gypsum fibers, carbon fibers, ground quartz, bentonite, metal whiskers, sodium sulfate, and mixtures thereof.

Preferred among them are plate fillers such as talc and mica, fibrous fillers such as glass fibers and gypsum fibers, needle fibers such as wollastonite, ground quartz and glass powder, and colloid fillers such as precipitated calcium carbonate having an average grain size of less than 1.0 μm because these fillers provide a composition having a good profile of quality.

The inorganic fillers used herein may be treated on the surface. Examples of the surface treating agent include silane coupling agents, titanate coupling agents, borane coupling agents, higher fatty acids, surface active agents and other wetting agents. These surface treating agents may be adsorbed on the surface of inorganic fillers before the fillers are blended with the resin, or added to a mill along with the resin and inorganic filler upon blending.

The aromatic polyester composition according to the third aspect of the present invention comprises 100 parts by weight of an aromatic polyester resin as defined in [1] and 1 to 400 parts by weight, preferably 10 to 250 parts by weight of an inorganic filler. The presence of 400 pbw of an inorganic filler renders injection molding very difficult, and invites such disadvantages as occurrence of flow marks upon molding, poor appearance of molded parts, and lack of mechanical strength.

[4] The composition according to the fourth aspect of the present invention is a composition comprising an aromatic polyesteramide as defined in [2] and an effective amount of an inorganic filler. The inorganic fillers used herein are as described above in [3].

The aromatic polyesteramide composition comprises 100 parts by weight of an aromatic polyesteramide resin as defined in [2] and 1 to 400 parts by weight, preferably 10 to 250 parts by weight of an inorganic filler. The loading of the filler is chosen in this range because injection molding is easy, and the appearance, mechanical strength, and mar resistance of a molded part are improved while minimizing the anisotropy thereof.

[5] The composition according to the fifth aspect of the present invention is a magnetic resin composition comprising an aromatic polyester as defined in [1] and an effective amount of a magnetic powder.

The magnetic powders used herein are not particularly limited, but usually selected from ferrite magnetic powders as represented by $MOFe_2O_3$ wherein M is Ba, Sr, Ca, Mg, Mn, Fe, Cu, Ni, Co, Zn or Pb; and rare earth element magnetic powders as represented by $RCo_5$ wherein R is a rare earth element such as Sm, Pr, Ce and La, $Sm_2X_{17}$ wherein X is Co, Fe, Cu, Zr, Ti or Hf, and NdFeB, and mixtures thereof.

The particle size of the magnetic powder is not critical. Preferably the magnetic powder has a particle size of from 0.1 to 100 $\mu$m, more preferably from 1 to 50 $\mu$m. Particles with a size of less than 0.1 $\mu$m tend to coalesce so that they cannot be uniformly dispersed in the composition. A resin composition loaded with particles with a size of more than 100 $\mu$m loses surface smoothness, good appearance and ease of molding.

The composition contains 100 parts by weight of a resin binder and 100 to 1900 parts by weight, preferably 400 to 1150 parts by weight of a magnetic powder. A composition containing less than 100 parts by weight of magnetic powder gives a molded part having insufficient magnetic properties to function as a magnet. A composition loaded with more than 1900 parts by weight of magnetic powder is less flowing upon melting and is molded with extreme difficulty into a part having poor mechanical strength.

The magnetic powder used herein may be treated on the surface. Examples of the surface treating agent include silane coupling agents, titanate coupling agents, borane coupling agents, higher fatty acids, surface active agents and other wetting agents. These surface treating agents may be adsorbed on the surface of magnetic powder before the powder is blended with the resin, or added to a mill along with the resin and magnetic powder upon blending.

The magnetic powder may be blended with the resin binder in any suitable milling means such as a single screw extruder, twin screw extruder, kneader, Banbury mixer, two roll mill, and Brabender mill. It is possible to add magnetic powder to a molten resin in a reaction vessel followed by mixing. It is also possible to mold the composition while mixing the resin and magnetic powder in a molding machine.

[6] The composition according to the sixth aspect of the present invention is a magnetic resin composition comprising an aromatic polyesteramide as defined in [2] and an effective amount of a magnetic powder.

The magnetic powders used herein are the same as described in [5] with rrespect to type and size.

The composition contains 100 parts by weight of a resin binder and 100 to 1900 parts by weight, preferably 400 to 1150 parts by weight of a magnetic powder. This loading ranges promises excellent magnetic properties, moldability and mechanical properties to molded parts.

The resins and resin compositions according to the first to sixth aspects of the present invention may further contain an additional unit or ingredient as long as the additional unit or ingredient does not detract from the advantages of the present invention. Compositions containing as its resinous component a copolymer or mixture of an aromatic polyester of [1] and an aromatic polyesteramide of [2] are also contemplated in the present invention.

The compositions of the present invention may have an additional ingredient incorporated therein. Such additional ingredients are resins; antioxidants; anticoloring agents; stabilizers; UV absorbers; plasticizers; lubricants such as molybdenum disulfide, silicone fluid, fluoro resins and graphite; and flame retardants such as tetrabromobisphenol-A and antimony trioxide.

The aromatic polyester and aromatic polyesteramide of the present invention can be prepared by any suitable polymerization process insofar as units (I) to (V) or (I) to (VI) can be incorporated in the resulting aromatic polyester or polyesteramide in a relative proportion as defined in the present invention.

The compositions of the present invention can be prepared by blending the resin with an inorganic filler or magnetic powder in any suitable commonly used milling means such as a single screw extruder, twin screw extruder, kneader, Banbury mixer, two roll mill, and Brabender mill. It is possible to add the inorganic filler or magnetic powder to a molten resin in a reaction vessel followed by mixing. It is also possible to mold the composition while mixing the resin and the inorganic filler or magnetic powder in a molding machine.

The aromatic polyesters and polyesteramides and compositions thereof according to the present invention have the following benefits.

[1] The aromatic polyester according to the first aspect of the present invention has a relatively low melting point of 330° C. or lower, optical anisotropy, excellent heat resistance and mechanical properties and can be molded by an ordinary melt molding technique such as injection molding, extrusion molding, compression molding, and blow molding.

The polyester of the present invention can be manufactured into any desired products including fibers, films, molded parts (except containers), and hoses. Molded parts of the present polyester can be widely used, for example, as connector IC sockets, encapsulation of IC's and transistors, optical fiber-related parts like cladding and reinforcing materials, and automobile parts.

A filler such as glass fibers, carbon fibers, and asbestos, an additive, and any other thermoplastic resin may be added to the polyester of the present invention such that the resulting composition may be molded into an article having desired properties.

[2] The aromatic polyesteramide according to the second aspect of the present invention not only maintains the advantages of the aromatic polyester of [1] including heat resistance, moldability, mechanical strength, flame retardancy, chemical resistance, solvent resistance, appearance, low coefficient of linear expansion, low mold shrinkage factor, and ease of injection molding, but also mitigates the mechanical anisotropy and thus has a high strength in a direction (TD) transverse to the orientation direction of the resin as melt molded products.

[3] The aromatic polyester composition according to the third aspect of the present invention has a high heat resistance or high heat distortion temperature althouth it can be injection molded at a relatively low temperature. It has improved mechanical strength and is also improved in anisotropy and marring which are undesirably low with conventional aromatic polyester compositions.

The present composition not only has high heat resistance, high modulus, high mar resistance and mitigated anisotropy, but is also characterized by arc resistance, soldering resistance and low mold shrinkage factor so that it may find applications as presicion molded parts for electric and mechanical implements, ovenproof dishes, and electronic material.

[4] The aromatic polyesteramide composition according to the fourth aspect of the present invention maintains the advantages of the polyester composition [3] mentioned above and has minimized the anisotropy thereof.

[5,6] The magnetic resin compositions according to the fifth and sixth aspects of the present invention can be readily molded into magnets which have a higher heat resistance than conventional plastic magnets and find a wider variety of applications.

EXAMPLES

Examples of the present invention are presented below by way of illustration and not by way of limitation.

Methods for evaluating resins and resin compositions of Examples and Comparative Examples are first described.

(1) Preparation of specimen

Test specimens are prepared by comminuting a polymeric resin, and molding the resin through an injection molding machine, model SAV-60-52 (manufactured by Sanjo Seiki K.K.) at a mold temperature of 120° C., an injection pressure of 250 kg/cm$^2$, and a sufficient cylinder temperature to allow the mold to be fully charged with the molten resin. The thus prepared test specimens include the following five types.
  (a) a plate of 120×120×2 mm.
  (b) pieces cut to a width of 14 mm from plate (a) in a flow direction (MD) of the resin and in a direction (TD) transverse to the flow direction.
  (c) a bar of ½×5×¼ inches.
  (d) a bar of ½×5×⅛ inches.
  (e) a disk having a diameter of 1 inch and a thickness of ½ inches cut from a molding.

(2) Molding temperature

The viscosity of a resin is determined by passing the resin through a flow tester (manufactured by Shimadzu Corp.) with a nozzle having a diameter of 0.5 mm and a length of 1.0 mm under a pressure of 10 kg/cm$^2$ while increasing the temperature at a rate of 6° C./min. The temperature at which a viscosity of 10,000 poise is reached is recorded. This temperature substantially corresponds to the cylinder temperature during injection molding. That is, the temperature at which the viscosity of a resin composition reaches 10,000 poise represents the molding temperature of the composition.

(3) Heat distortion temperature (HDT)

The heat distortion temperature of a sample is determined according to ASTM D648 under a load of 18.6 kg/cm$^2$.

(4) Injection molding temperature (IMT)

The injection molding temperature is the cylinder temperature set in the injection molding process described in (2). The lower the injection molding temperature, the better the resin is moldable.

(5) Bend test

A bend test is carried out according to ASTM D790.

(6) Anisotropy test

The flexural strengths (FS) of a specimen in MD and TD directions are determined. The ratio of MD flexural strength to TD flexural strength (MD/TD) is calculated to evaluate the anisotropy of mechanical strength. The higher the MD/TD ratio, the greater the anisotropy is.

(7) Mar resistance (MR)

The mar resistance of a resin is judged by the method which is selected in view of a practical application of the resin. A pencilscribing test machine as prescribed in JIS K 5401 is modified by setting a 100-yen coin in a mount instead of a pencil, moving the coin under a load of 1000 g over a specimen of 120×120×2 mm in five passes (each pass includes forward and backward movements) in a resin flow direction. The track of the coin is visually observed under the following criterion.

| Observation | Evaluation |
| --- | --- |
| No mark observable | O |
| Marks observable | X |

(8) Magnetic properties

A specimen having a diameter of 1″ and a thickness of ⅛″ cut from a molded part is set in a BH loop tracer (Yokogawa Electric Corp.) to determine the residual magnetic flux density Br, coercive force Hc, and maximum energy product (BH)max.

[1] First, examples of the aromatic polyester according to the first aspect of the present invention are presented along with comparative examples.

EXAMPLE 1

A 500-ml separable flask equipped with a sealed stirrer, a gas inlet tube, and a distillation head with a condenser was charged with 60 grams (0.333 mol) of p-acetoxybenzoic acid, 3 grams (0.0167 mol) of m-acetoxybenzoic acid, 8.52 grams (0.0513 mol) of terephthalic acid, 11.1 grams (0.0514 mol) of 2,6-naphthalene dicarboxylic acid, and 27.75 grams (0.1028 mol) of 4,4'-diacetoxybiphenyl.

The flask was evacuated to vacuum and purged of air by blowing dry argon twice. While argon was gently passed, the flask with the contents was heated at 250° C. with stirring.

Shortly after the mixture was melted, acetic acid started stripping out. The flask with the contents was maintained at 250° C. for about 2 hours before the temperature was raised to 280° C. The contents were maintained at 280° C. for about one hour to collect 30.6 grams of acetic acid. The temperature of the contents was raised to 320° C. and maintained at the temperature for 15 minutes, and then further raised to 340° C. and maintained at the temperature for 15 minutes. At this point the amount of acetic acid stripped and condensed totaled to 32 grams.

Thereafter vacuum operation was commenced. Polymerization was continued at 350° C. while the flask was maintained at a vacuum of 90 mmHg for 5 minutes, at a vacuum of 30 mmHg for 5 minutes, at a vacuum of 3 mmHg for 10 minutes, and finally at a vacuum of 0.3 mmHg for 15 minutes. At this point, the contents were opaque, yellowish white, and fairly viscous. The contents were then cooled under an argon stream and the resulting aromatic polyester was recovered.

A differential thermal analysis of the polyester showed a melting point of 294° C. A sample of the polyester was placed on a sample plate in a polarization microscope and heated there for optical anisotropy determination. The polyester clearly showed optical anisotropy. The polyester was measured by a polymer type flow tester having a nozzle diameter of 0.5×1.0 mm under a load of 10 kg-f, determining a viscosity of 10,000 poise at 293° C.

The polyester was injection molded into a bar of ⅛"×5"×¼" which was measured for Vicat softening point and heat distortion temperature (HDT).

| Vicat softening point | 246° C. |
|---|---|
| heat distortion temperature | 196° C. |

The polyester was melt spun into a filament by means of a spinning machine equipped with a single capillary tube having a spinning nozzle diameter of 0.3 mm and a length of 0.9 mm. The filament was highly tough and had excellent mechanical properties as shown below.

| Strength | 10.0 gram/denier |
|---|---|
| Tensile modulus | 60.0 GPa |
| Elongation | 1.87% |

The composition and physical properties of the polyester are shown in Table 1.

EXAMPLE 2

Copolyesters of various compositions were prepared by substantially repeating the procedure of Example 1. The composition and the results are shown in Table 1. All these polyesters showed optical anisotropy in a static condition at a temperature higher than the flow temperature.

COMPARATIVE EXAMPLES 1-6

For comparison purposes, spun filaments and molded parts of prior art liquid crystalline copolyesters were measured for heat distortion temperature (HDT). The results are shown in Table 2.

The composition of these copolyesters is also shown in Table 2. The temperature at the final stage of polymerization was set at 350° C. for Comparative Examples 1-3 and at 320° C. for Comparative Examples 4-6. Each of the copolyesters formed a liquid crystal at a temperature above its flow temperature.

TABLE 1

| Example | Composition (mol %) | | | | | Molding temp. (°C.) | HDT (°C.) | Physical properties of fiber | | |
|---|---|---|---|---|---|---|---|---|---|---|
| | I | II-ii | III | IV | V | | | Tensile strength (g/d) | Tensile modulus (GPa) | Elongation (%) |
| 1   | 60 | 3 | 9.25  | 9.25  | (B) 18.5 | 293 | 196 | 10.0 | 60 | 1.87 |
| 2-1 | 60 | 2 | 9.5   | 9.5   | (B) 19.0 | 291 | 195 | 5.0  | 50 | 2.11 |
| 2-2 | 60 | 5 | 8.75  | 8.75  | (B) 17.5 | 279 | 173 | 5.2  | 44 | 2.73 |
| 2-3 | 40 | 3 | 14.25 | 14.25 | (B) 28.5 | 271 | 189 | 5.6  | 59 | 2.36 |
| 2-4 | 65 | 3 | 8.0   | 8.0   | (B) 16.0 | 297 | 198 | 8.6  | 58 | 1.88 |
| 2-5 | 60 | 3 | 4.63  | 13.87 | (B) 18.5 | 302 | 205 | 4.0  | 30 | 2.65 |
| 2-6 | 60 | 3 | 11.5  | 7.0   | (B) 18.5 | 298 | 195 | 5.6  | 30 | 1.89 |
| 2-7 | 60 | 3 | 13.87 | 4.63  | (N) 18.5 | 318 | 207 | 11.9 | 60 | 2.03 |
| 2-8 | 60 | 3 | 9.25  | 9.25  | (N) 18.5 | 287 | 180 | 9.8  | 65 | 2.96 |

(B) 4,4'-dihydroxybiphenyl
(N) 2,6-dihydroxynaphthalene (I) 

(II-ii) 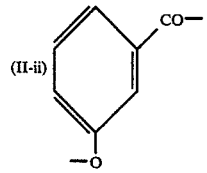

(III) 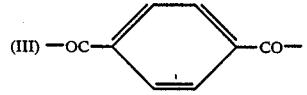

(IV) 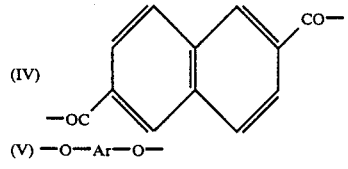

(V) —O—Ar—O—

TABLE 2

| Comparative Example | Composition (mol %) | | | | | Molding temp. (°C.) | HDT (°C.) | Physical properties of fiber | | | Remarks |
| --- | --- | --- | --- | --- | --- | --- | --- | --- | --- | --- | --- |
| | I | II-ii | III | IV | V | | | Tensile strength (g/d) | Tensile modulus (GPa) | Elongation (%) | |
| 1 | 60 | 10 | 7.5 | 7.5 | (B) 15 | 275 | 83 | 3.1 | 25 | 3.12 | |
| 2 | 15 | 3 | 20.5 | 20.5 | (B) 41 | 335 | — | — | — | — | unspinnable |
| 3 | 85 | 3 | 3 | 3 | (B) 6 | 350 | 213 | — | — | — | unspinnable |
| 4 (U.S. Pat. No. 4083829) | 60 | — | 10* | 10 | (B) 20 | 279 | 142 | 5.8 | 60 | 2.2 | |
| 5 (U.S. Pat. No. 4169933) | 60 | — | 10 | 10 | (B) 20 | 267 | 147 | 3.8 | 30 | 3.21 | |
| 6 (U.S. Pat. No. 4130545) | 60 | 10 | — | 10 | (B) 20 | 305 | 168 | 4.5 | 42 | 1.89 | |

(B) 4,4'-dihydroxybiphenyl
*isophthalic acid

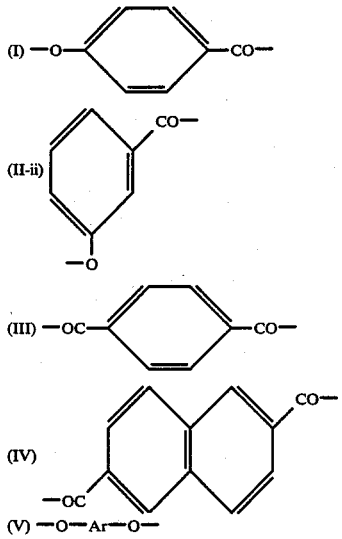

EXAMPLE 3

A 500-ml separable flask equipped with a sealed stirrer, a gas inlet tube, and a distillatin head with a condenser was charged with 60 grams (0.333 mol) of p-acetoxybenzoic acid, 2.77 grams (0.0167 mol) of isophthalic acid, 6.45 grams (0.0389 mol) of terephthalic acid, 12.0 grams (0.0556 mol) of 2,6-naphthalene dicarboxylic acid, and 30 grams (0.111 mol) of 4,4'-diacetoxybiphenyl.

The flask was evacuated to vacuum and purged of air by blowing dry argon twice. While argon was gently passed, the flask with the contents was heated at 250° C. with stirring.

Shortly after the mixture was melted, acetic acid started stripping out. The flask with the contents was maintained at 250° C. for about 2 hours before the temperature was raised to 280° C. The contents were maintained at 280° C. for about one hour to collect 30.7 grams of acetic acid. The temperature of the contents was raised to 320° C. and maintained at the temperature for 15 minutes, and then further raised to 340° C. and maintained at the temperature for 15 minutes. At this point the amount of acetic acid stripped and condensed totaled to 32.3 grams.

Thereafter vacuum operation was commenced. Polymerization was continued at 350° C. while the flask was maintained at a vacuum of 90 mmHg for 5 minutes, at a vacuum of 30 mmHg for 5 minutes, at a vacuum of 3 mmHg for 10 minutes, and finally at a vacuum of 0.3 mmHg for 15 minutes. At this point, the contents were opaque, yellowish white, and fairly viscous. The contents were then cooled under an argon stream and the resulting aromatic polyester was recovered.

A differential thermal analysis of the polyester showed a melting point of 285° C. A sample of the polyester was placed on a sample plate in a polarization microscope and heated there for optical anisotropy observation. The polyester clearly showed optical anisotropy. The polyester was measured by a polymer type flow tester having a nozzle diameter of 0.5×1.0 mm under a load of 10 kg-f, determining a viscosity of 10,000 poise at 288° C.

The polyester was molded into a bar which was measured for Vicat softening point and heat distortion temperature (HDT).

| | |
| --- | --- |
| Vicat softening point | 250° C. |
| heat distortion temperature | 198° C. |

The polyester was melt spun into a filament by means of a spinning machine equipped with a single capillary tube having a spinning nozzle diameter of 0.3 mm and a length of 0.9 mm. The filament was highly tough and had excellent mechanical properties as shown below.

| | |
| --- | --- |
| Strength | 5.0 gram/denier |
| Tensile modulus | 90.0 GPa |
| Elongation | 1.78% |

The results are shown in Table 3.

EXAMPLE 4

Copolyesters of various compositions were prepared by substantially repeating the procedure of Example 3. The composition and the results are shown in Table 3. All these polyesters showed optical anisotropy in a static condition at a temperature higher than the flow temperature.

COMPARATIVE EXAMPLES 7-8

For comparison purposes, spun filaments and molded parts of prior art liquid crystalline copolyesters were measured for heat distortion temperature (HDT). The results are shown in Table 4.

The composition of these copolyesters is also shown in Table 4. The temperature at the final stage of polymerization was set at 350° C. in Comparative Example 7 and at 360° C. in Comparative Example 8. Each of the aromatic copolyesters formed a liquid crystal at a temperature above its flow temperature.

TABLE 3

| | Composition (mol %) | | | | | Molding | HDT | Physical properties of fiber | | |
| --- | --- | --- | --- | --- | --- | --- | --- | --- | --- | --- |
| | | | | | | | | Tensile strength | Tensile modulus | Elongation |
| Example | I | II-i | III | IV | V | temp. (°C.) | (°C.) | (g/d) | (GPa) | (%) |
| 3 | 60 | 3 | 7 | 10.0 | (B) 20 | 286 | 198 | 5.0 | 90 | 1.78 |
| 4-1 | 60 | 2 | 7.2 | 10.8 | (B) 20 | 312 | 205 | 4.5 | 54 | 2.2 |
| 4-2 | 60 | 5 | 6 | 9.0 | (B) 20 | 271 | 175 | 3.6 | 63 | 3.23 |
| 4-3 | 40 | 3 | 13.5 | 13.5 | (B) 30 | 280 | 191 | 5.0 | 53 | 1.96 |
| 4-4 | 65 | 3 | 7.25 | 7.25 | (B) 17.5 | 312 | 200 | 3.5 | 30 | 1.93 |
| 4-5 | 60 | 3 | 5 | 12 | (B) 20 | 286 | 195 | 6.7 | 65 | 3.1 |
| 4-6 | 60 | 3 | 11.9 | 5.1 | (B) 20 | 314 | 204 | 7.0 | 60 | 1.63 |
| 4-7 | 60 | 3 | 5.0 | 12.0 | (N) 20 | 286 | 185 | 7.8 | 62 | 2.91 |

(B) 4,4'-dihydroxybiphenyl
(N) 2,6-dihydroxynaphthalene

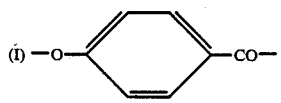

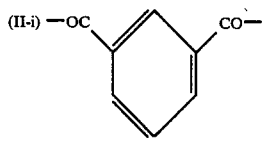

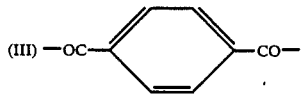

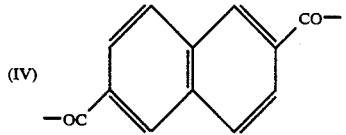

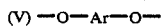

TABLE 4

| | Composition (mol %) | | | | | Molding | HDT | Physical properties of fiber | | | |
| --- | --- | --- | --- | --- | --- | --- | --- | --- | --- | --- | --- |
| | | | | | | | | Tensile strength | Tensile modulus | Elongation | |
| Comparative Example | I | II-i | III | IV | V | temp. (°C.) | (°C.) | (g/d) | (GPa) | (%) | Remarks |
| 7 | 60 | 10 | 2 | 8 | (B) 20 | 247 | 132 | 6.0 | 55 | 3.51 | |
| 8 (U.S. Pat. No. 3637595) | 60 | 15 | 5 | — | (B) 20 | 350 | ≧260 | 1.8 | 13 | 3.43 | |
| 4 (U.S. Pat. No. | 60 | 10 | — | 10 | (B) 20 | 279 | 142 | 5.8 | 60 | 2.2 | |

TABLE 4-continued

| Comparative Example | Composition (mol %) | | | | | Molding temp. (°C.) | HDT (°C.) | Physical properties of fiber | | | Remarks |
|---|---|---|---|---|---|---|---|---|---|---|---|
| | I | II-i | III | IV | V | | | Tensile strength (g/d) | Tensile modulus (GPa) | Elongation (%) | |
| 4083829) | | | | | | | | | | | |

(B) 4,4'-dihydroxybiphenyl (I) —O—⬡—CO—

(II-i) —OC—⬡—CO—

(III) —OC—⬡—CO—

(IV) —OC—⬡⬡—CO—

(V) —O—Ar—O—

EXAMPLE 5

A series of aromatic polyesters comprising the following units in which unit (II) is unit (II-i) were synthesized by the same procedure as used in Example 1. The polyesters had varying ratios of III/(III+IV), that is, m/(m+n) and their injection molding temperature and heat distortion temperature were measured. The resulting data are plotted in FIG. 1.

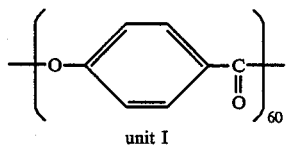
unit I

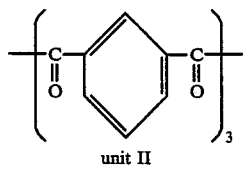
unit II

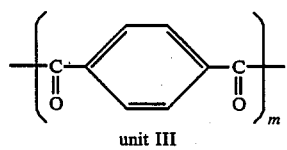
unit III

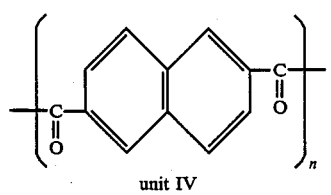
unit IV

-continued

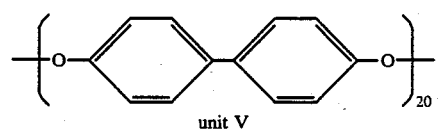
unit V

EXAMPLE 6

A series of aromatic polyesters comprising the following units in which unit (II) is unit (II-ii) were synthesized by the same procedure as used in Example 1. The polyesters had varying ratios of III/(III+IV), that is, p/(p+q) and their injection molding temperature and heat distortion temperature were measured. The resulting data are plotted in FIG. 2.

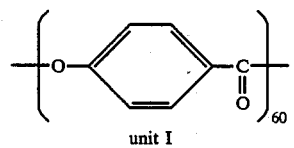
unit I

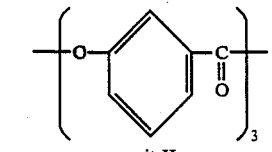
unit II

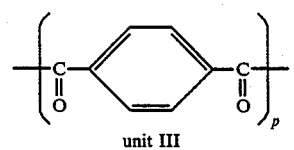
unit III

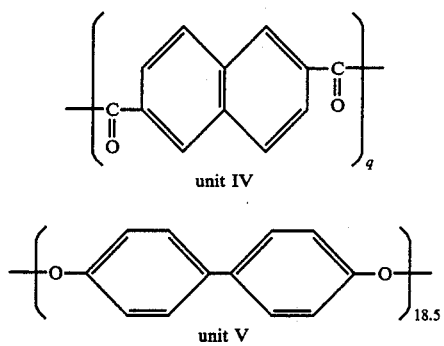

unit IV unit V

[2] Next, examples of the aromatic polyesteramide according to the second aspect of the present invention are presented along with comparative examples.

EXAMPLE 7

A polymerization vessel equipped with an agitator with a torque meter and a revolution meter, an argon inlet tube, and a thermometer was charged with 1714 grams (9.52 mol, 59.5 mol%) of p-acetoxybenzoic acid, 80 grams (0.48 mol, 3 mol%) of isophthalic acid, 186 grams (1.12 mol, 7 mol%) of terephthalic acid, 346 grams (1.6 mol, 10 mol%) of 2,6-naphthalenedicarboxylic acid, 864 grams (3.2 mol, 20 mol%) of 4,4'-diacetoxybiphenyl, and 14.3 grams (0.08 mol, 0.5 mol%) of p-acetamidobenzoic acid.

The interior of the vessel was fully replaced by argon and then heated to a temperature of 260° C. over a period of about 30 minutes. After the contents were melted, agitation was started. Distillation of acetic acid started at a temperature of approximately 230° C. Polymerization was carried out for 1 hour at 260° C., another 1 hour at 280° C. and a further 1 hour at 300° C. Then the pressure was gradually reduced. Finally, polymerization was continued at 320° C. and 0.5 mmHg until the agitator reached a predetermined torque.

The same polymerization procedure as above was repeated except that the amounts of p-acetoxybenzoic acid and p-acetamidobenzoic acid added were changed. The amounts added are shown below.

| p-acetoxybenzoic acid | p-acetamidobenzoic acid |
|---|---|
| 1699 g (9.44 mol, 59 mol %) | 28.6 g (0.16 mol, 1 mol %) |
| 1642 g (9.12 mol, 57 mol %) | 85.8 g (0.48 mol, 3 mol %) |
| 1584 g (8.8 mol, 55 mol %) | 143.2 g (0.8 mol, 5 mol %) |
| 1526 g (8.48 mol, 53 mol %) | 200.5 g (1.12 mol, 7 mol %) |
| 1440 g (8 mol, 50 mol %) | 286.4 g (1.6 mol, 10 mol %) |

The thus polymerized polyesteramides were observed under a polarization microscope (Nikon polarization microscope type POH equipped with a heat stage). They showed optical anisotropy when a light shearing stress was applied to them in molten state, indicating that they were thermotropic liquid crystalline polyesteramides.

Figure 4:
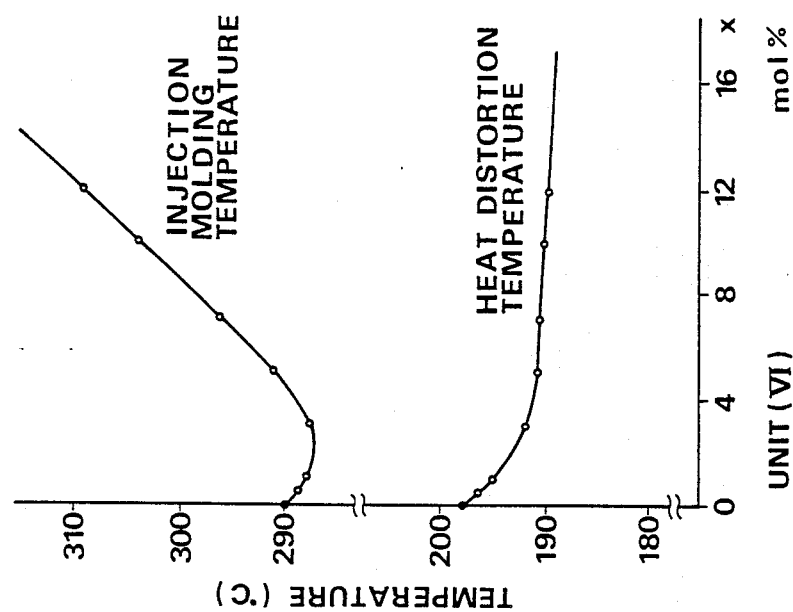
Figure 3:
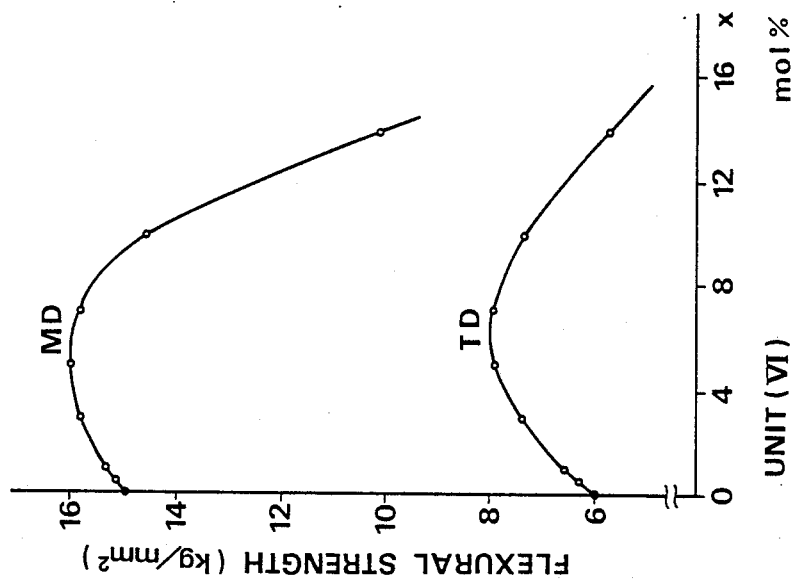

For the aromatic polyesteramides thus obtained, the proportion of units based on the amount of starting charges is shown in Table 5. Their physical properties are plotted in FIGS. 3 and 4.

COMPARATIVE EXAMPLE 9

The procedure of Example 7 was repeated except that the p-acetoamidebenzoic acid was omitted and 1728 grams (9.6 mol, 60 mol%) of p-acetoxybenzoic acid was used. The procedure of Example 7 was also repeated except that the amounts of p-acetoxybenzoic acid and p-acetamidobenzoic acid charged were changed to 1296 grams (7.2 mol, 45 mol%) and 430 grams (2.4 mol, 15 mol%), respectively. The resulting resins were injection molded into bars which were measured for physical properties.

The proportion of units based on the amounts of charges is shown in Table 5. The physical properties are plotted in FIGS. 3 and 4. It is to be noted with respect to FIGS. 3 and 4 that the abscissa represents the mol percent, x of unit (VI) which has the formula:

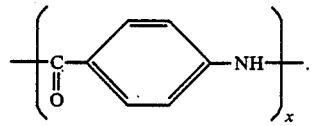

EXAMPLE 8

Polymerization, molding and physical evaluation were carried out by following the procedures of Example 7 except that the polymerization vessel was charged with 1728 grams (9.6 mol, 60 mol%) of p-acetoxybenzoic acid, 86.4 grams (0.48 mol, 3 mol%) of m-acetoxybenzoic acid, 246 grams (1.48 mol, 9.25 mol%) of terephthalic acid, 320 grams (1.48 mol, 9.25 mol%) of 2,6-naphthalenedicarboxylic acid, 777.6 grams (2.88 mol, 18 mol%) of 4,4'-diacetoxybiphenyl, and 15.4 grams (0.08 mol, 0.5 mol%) of 4-acetoxyacetanilide.

Also, polymerization, molding and physical evaluation were carried out by following the procedures of Example 7 except that the amounts of 4,4'-diacetoxybiphenyl and 4-acetoxyacetanilide added were changed. The amounts of the charges are given below.

| 4,4'-diacetoxybiphenyl | 4-acetoxyacetanilide |
|---|---|
| 756 g (2.8 mol, 17.5 mol %) | 30.8 g (0.16 mol, 1 mol %) |
| 669.6 g (2.48 mol, 15.5 mol %) | 92.6 g (0.48 mol, 3 mol %) |
| 583.2 g (2.16 mol, 13.5 mol %) | 154.4 g (0.8 mol, 5 mol %) |

All these polymers were observed under a polarization microscope to be thermotropic liquid crystalline polyesteramides.

Figure 6:
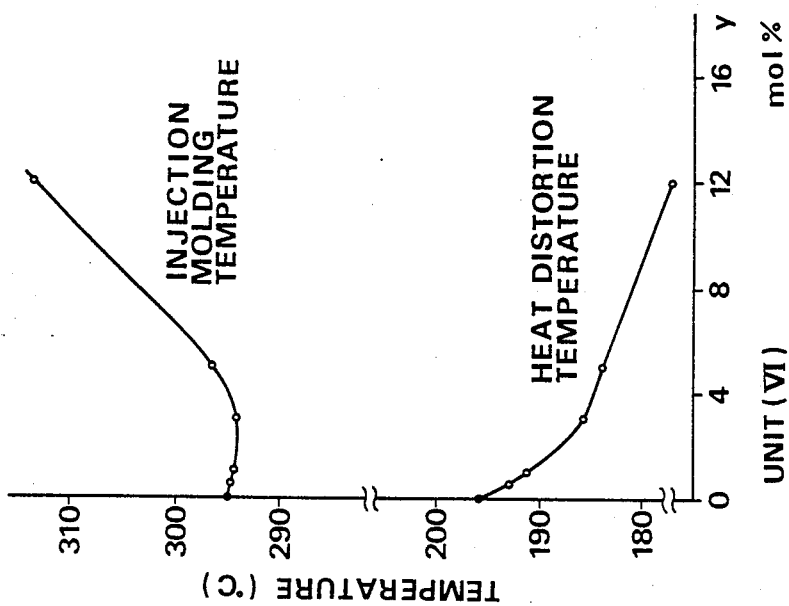
Figure 5:
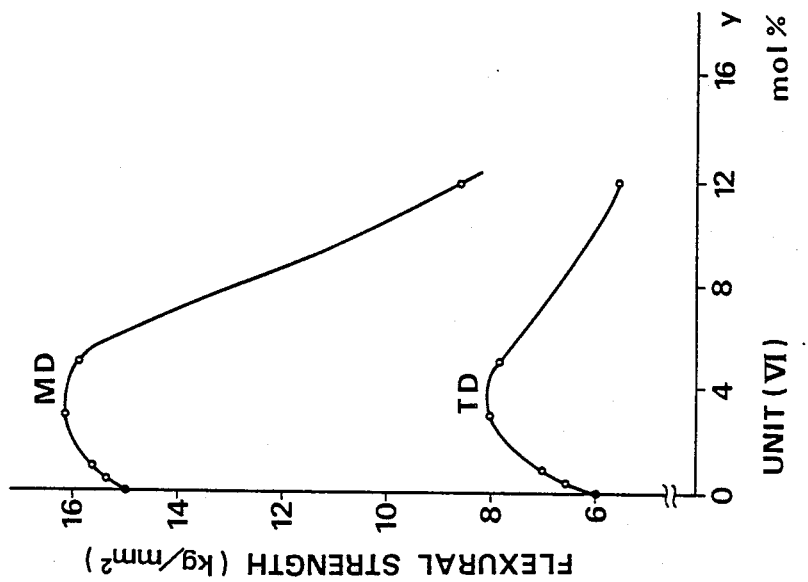

The proportion of units based on the amount of charges is shown in Table 5. The physical properties are plotted in FIGS. 5 and 6. It is to be noted with respect to FIGS. 5 and 6 that the abscissa represents the mol percent, y of unit (VI) which has the formula:

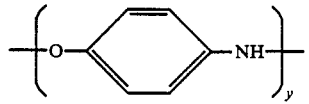

COMPARATIVE EXAMPLE 10

The procedure of Example 8 was repeated except that the 4-acetoxyacetanilide was omitted and 799.2 grams (2.96 mol, 18.5 mol%) of 4,4'-diacetoxybiphenyl was used. The procedure of Example 8 was also repeated except that the amounts of 4,4'-diacetoxybiphenyl and 4-acetoxyacetanilide charged were changed to 280.8 grams (1.04 mol, 6.5 mol%) and 370.6 grams (1.92 mol, 12 mol%), respectively. The resulting resins were injection molded into bars which were measured for physical properties.

The proportion of units based on the amount of charges is shown in Table 5. The physical properties are plotted in FIGS. 5 and 6.

EXAMPLES 9–10

Polyesteramides having the composition shown in Table 5 were synthesized by the same procedure as in Example 7. These polymers were observed under a polarization microscope to be thermotropic liquid crystalline polyesteramides.

The results are shown in Table 6.

TABLE 5

| Example | Composition |
|---|---|
| Example 7 | $\left[O-\bigcirc-O-\overset{O}{\underset{\|}{C}}\right]_{60-x} \left[\overset{O}{\underset{\|}{C}}-\bigcirc-\overset{O}{\underset{\|}{C}}\right]_3 \left[\overset{O}{\underset{\|}{C}}-\bigcirc-\overset{O}{\underset{\|}{C}}\right]_7 \left[\overset{O}{\underset{\|}{C}}-\bigcirc\bigcirc-\overset{O}{\underset{\|}{C}}\right]_{10} \left[O-\bigcirc-\bigcirc-O\right]_{20} \left[\overset{O}{\underset{\|}{C}}-\bigcirc-NH\right]_x$  $x = 0.5, 1, 3, 5, 7, 10$ |
| Comparative Example 9 | Same as Example 7, with $x = 0$, $x = 15$ |
| Example 8 | $\left[O-\bigcirc-O-\overset{O}{\underset{\|}{C}}\right]_{60} \left[\overset{O}{\underset{\|}{C}}-\bigcirc-O\right]_3 \left[\overset{O}{\underset{\|}{C}}-\bigcirc-\overset{O}{\underset{\|}{C}}\right]_{9.25} \left[\overset{O}{\underset{\|}{C}}-\bigcirc\bigcirc-\overset{O}{\underset{\|}{C}}\right]_{9.25} \left[O-\bigcirc-\bigcirc-O\right]_{18.5-y} \left[O-\bigcirc-NH\right]_y$  $y = 0.5, 1, 3, 5$ |
| Comparative Example 10 | Same as Example 8, with $y = 0$, $y = 12$ |
| Example 9 | $\left[O-\bigcirc-O-\overset{O}{\underset{\|}{C}}\right]_{60} \left[\overset{O}{\underset{\|}{C}}-\bigcirc-O\right]_3 \left[\overset{O}{\underset{\|}{C}}-\bigcirc-\overset{O}{\underset{\|}{C}}\right]_7 \left[\overset{O}{\underset{\|}{C}}-\bigcirc\bigcirc-\overset{O}{\underset{\|}{C}}\right]_{10} \left[O-\bigcirc-\bigcirc-O\right]_{15} \left[NH-\bigcirc-NH\right]_5$ |
| Example 10 | $\left[O-\bigcirc-O-\overset{O}{\underset{\|}{C}}\right]_{60} \left[\overset{O}{\underset{\|}{C}}-\bigcirc-O\right]_{1.5} \left[\overset{O}{\underset{\|}{C}}-\bigcirc-\overset{O}{\underset{\|}{C}}\right]_{9.25} \left[\overset{O}{\underset{\|}{C}}-\bigcirc\bigcirc-\overset{O}{\underset{\|}{C}}\right]_{9.25} \left[O-\bigcirc-\bigcirc-O\right]_{18.5} \left[\overset{O}{\underset{\|}{C}}-\bigcirc-NH\right]_{1.5}$ |

TABLE 6

| Example | Flexural strength (kg/mm²) MD | TD | HDT (°C.) | IMT (°C.) |
|---|---|---|---|---|
| 9 | 15.5 | 7.7 | 178 | 315 |
| 10 | 16.0 | 8.0 | 192 | 291 |

[3] Examples of the aromatic polyester composition according to the third aspect of the present invention are presented along with comparative examples.

EXAMPLE 11

A 5-liter glass reaction vessel equipped with an agitator with a torque meter and a revolution meter, an argon inlet tube, and a thermometer was charged with 1200 grams (6.66 mol) of p-acetoxybenzoic acid, 55.4 grams (0.334 mol) of isophthalic acid, 129 grams (0.778 mol) of terephthalic acid, 240 grams (1.112 mol) of 2,6-naphthalenedicarboxylic acid, and 600 grams (2.22 mol) of 4,4'-diacetoxybiphenyl. The interior of the vessel was fully replaced by argon and then heated up to a temperature of 250° C. over a period of about 30 minutes. After the contents were melted, agitation was started.

After acetic acid started distilling out, the temperature was raised to 280° C. over 10 minutes, maintained at the temperature for 30 minutes, again raised to 300° C. over 10 minutes, and maintained at the temperature for 30 minutes.

The temperature was raised to 310° C. over 10 minutes, and then the pressure was gradually reduced eventually to 1 mmHg over a period of about 20 minutes. Polymerization was continued under these conditions until the agitator reached a predetermined torque at a predetermined rpm. The resulting aromatic polyester was blended with glass fibers having an average diameter of 11 μm and a length of 3 mm (manufactured by Fuji Fiber Glass K.K., FES-03-1208PE) in a weight ratio of 7:3, pelletized, and then injection molded into specimens which were measured for physical properties.

The results are shown in Table 7.

EXAMPLE 12

An aromatic polyester was synthesized by the same procedure as in Example 11 except that there were charged 800 grams (4.44 mol) of p-acetoxybenzoic acid, 55.4 grams (0.334 mol) of isophthalic acid, 248.7 grams (1.5 mol) of terephthalic acid, 323.7 grams (1.5 mol) of 2,6-naphthalenedicarboxylic acid, and 900 grams (3.33 mol) of 4,4'-diacetoxybiphenyl. The resulting aromatic polyester was blended and milled with the same glass fibers in the same ratio, molded and evaluated in the same manner as in Example 11.

The results are shown in Table 7.

EXAMPLE 13

An aromatic polyester was synthesized by the same procedure as in Example 11 except that there were charged 1300 grams (7.215 mol) of p-acetoxybenzoic acid, 55.4 grams (0.334 mol) of isophthalic acid, 133.8 grams (0.806 mol) of terephthalic acid, 174 grams (0.806 mol) of 2,6-naphthalenedicarboxylic acid, and 525 grams (1.943 mol) of 4,4'-diacetoxybiphenyl. The resulting aromatic polyester was blended and milled with the same glass fibers in the same ratio, molded and evaluated in the same manner as in Example 11.

The results are shown in Table 7.

EXAMPLE 14

An aromatic polyester was synthesized by the same procedure as in Example 11 except that there were charged 1300 grams (7.215 mol) of p-acetoxybenzoic acid, 59.9 grams (0.361 mol) of isophthalic acid, 67.9 grams (0.409 mol) of terephthalic acid, 353.2 grams (1.635 mol) of 2,6-naphthalenedicarboxylic acid, and 649.4 grams (2.405 mol) of 4,4'-diacetoxybiphenyl. The resulting aromatic polyester was blended and milled with the same glass fibers in the same ratio, molded and evaluated in the same manner as in Example 11.

The results are shown in Table 7.

EXAMPLE 15

An aromatic polyester was synthesized by the same procedure as in Example 11 except that there were charged 1300 grams (7.215 mol) of p-acetoxybenzoic acid, 59.9 grams (0.361 mol) of isophthalic acid, 219.6 grams (1.323 mol) of terephthalic acid, 156 grams (0.722 mol) of 2,6-naphthalenedicarboxylic acid, and 649.4 grams (2.405 mol) of 4,4'-diacetoxybiphenyl. The resulting aromatic polyester was blended and milled with the same glass fibers in the same ratio, molded and evaluated as in Example 11.

The results are shown in Table 7.

EXAMPLES 16-17

The same aromatic polyester as used in Example 11 was blended and milled with the same glass fibers as used in Example 11, but in varying proportions. Evaluation was maded in a similar manner.

The results are shown in Table 7.

EXAMPLE 18

The same aromatic polyester as used in Example 11 was blended and milled with wollastonite (Hayashi Chemicals K.K., UM-8N) in a weight ratio of 6:4 in the same manner as in Example 11. Evaluation was maded in a similar manner.

The results are shown in Table 8.

EXAMPLE 19

The same aromatic polyester as used in Example 12 was blended and milled with wollastonite (UM-8N) in a weight ratio of 6:4 in the same manner as in Example 11. Evaluation was maded in a similar manner.

The results are shown in Table 8.

EXAMPLES 20-22

The same aromatic polyesters as used in Examples 13, 14 and 15 were blended and milled with wollastonite (UM-8N) in a weight ratio of 6:4 in the same manner as in Example 11. Evaluation was maded in a similar manner.

The results are shown in Table 8.

EXAMPLE 23-24

The same aromatic polyester as used in Example 11 was blended and milled with wollastonite (UM-8N) in a varying weight ratio reported in Table 8 in the same manner as in Example 11. Evaluation was maded in a similar manner.

The results are shown in Table 8.

COMPARATIVE EXAMPLES 11-13

For comparison purposes, a polyester having a composition outside the scope of the present invention as shown in Table 7 was synthesized as Comparative Example 11. Known polyesters of U.S. Pat. Nos. 3,637,595 and 4,083,829 were synthesized as Comparative Examples 12 and 13. Each polyester was mixed with glass fibers, milled, molded, and evaluated in the same manner as in Example 11.

The results are shown in Table 7.

The results are shown in Table 7.

COMPARATIVE EXAMPLES 15-17

The same aromatic polyesters as used in Comparative Examples 11-13 were blended with wollastonite, milled, molded and evaluated in the same manner as in Example 18.

The results are shown in Table 8.

TABLE 7

| | Resin units (mol %) | | | | | Composition (wt %) | | Bend Test | | | | | |
| | I | II | III | IV | V | Polyester | Glass fiber | Strength in MD ($Kg/cm^2$) | Strength in TD ($Kg/cm^2$) | MD/TD | Modulus in MD ($Kg/cm^2$) | HDT (°C.) | IMT (°C.) | MR |
|---|---|---|---|---|---|---|---|---|---|---|---|---|---|---|
| Example 11 | 60 | 3 | 7 | 10 | 20 | 70 | 30 | 2600 | 1450 | 1.8 | 150000 | 245 | 290 | |
| Example 12 | 40 | 3 | 13.5 | 13.5 | 30 | 70 | 30 | 2050 | 1200 | 1.7 | 140000 | 240 | 285 | |
| Example 13 | 65 | 3 | 7.25 | 7.25 | 17.5 | 70 | 30 | 2200 | 1300 | 1.7 | 155000 | 248 | 315 | |
| Example 14 | 60 | 3 | 3.4 | 13.6 | 20 | 70 | 30 | 2500 | 1400 | 1.8 | 150000 | 250 | 300 | |
| Example 15 | 60 | 3 | 11 | 6 | 20 | 70 | 30 | 2500 | 1400 | 1.7 | 155000 | 255 | 310 | |
| Example 16 | 60 | 3 | 7 | 10 | 20 | 90 | 10 | 1900 | 1060 | 1.8 | 105000 | 220 | 290 | |
| Example 17 | 60 | 3 | 7 | 10 | 20 | 50 | 50 | 2800 | 1650 | 1.7 | 180000 | 250 | 290 | |
| Comparative Example 11 | 60 | 10 | 2 | 8 | 20 | 70 | 30 | 1900 | 1000 | 1.9 | 140000 | 160 | 255 | |
| Comparative Example 12 | 60 | 15 | 5 | | 20 | 70 | 30 | 1300 | 690 | 1.9 | 95000 | 320 | 400 | |
| Comparative Example 13 | 60 | 10 | | 10 | 20 | 70 | 30 | 2250 | 1180 | 1.9 | 140000 | 162 | 295 | |
| Comparative Example 14 | 60 | 3 | 7 | 10 | 20 | 100 | 0 | 1500 | 600 | 2.5 | 83000 | 198 | 290 | X |

Units

I

II

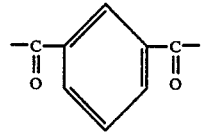

III

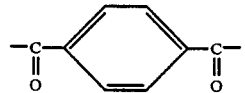

IV

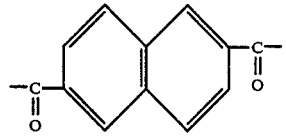

V

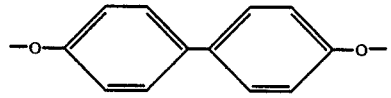

COMPARATIVE EXAMPLE 14

The same aromatic polyester as used in Example 11 was molded without an inorganic filler and evaluated in the same manner as in Example 11.

TABLE 8

| | Resin units (mol %) | | | | | Composition (wt %) | | Bend test | | | | | |
| | I | II | III | IV | V | Polyester | Wollastonite | Strength in MD ($Kg/cm^2$) | Strength in TD ($Kg/cm^2$) | MD/TD | Modulus in MD ($Kg/cm^2$) | HDP (°C.) | IMT (°C.) | MR |
|---|---|---|---|---|---|---|---|---|---|---|---|---|---|---|
| Example 18 | 60 | 3 | 7 | 10 | 20 | 60 | 40 | 1800 | 1060 | 1.7 | 140000 | 215 | 290 | |
| Example 19 | 40 | 3 | 13.5 | 13.5 | 30 | 60 | 40 | 1600 | 950 | 1.7 | 135000 | 210 | 285 | |
| Example 20 | 65 | 3 | 7.25 | 7.25 | 17.5 | 60 | 40 | 1800 | 1050 | 1.7 | 150000 | 220 | 315 | |
| Example 21 | 60 | 3 | 3.4 | 13.6 | 20 | 60 | 40 | 1800 | 1050 | 1.7 | 150000 | 220 | 300 | |
| Example 22 | 60 | 3 | 11 | 6 | 20 | 60 | 40 | 1800 | 1060 | 1.7 | 145000 | 225 | 310 | |

TABLE 8-continued

| | Resin units (mol %) | | | | | Composition (wt %) | | Bend test | | | | HDP | IMT | |
| | | | | | | | | Strength in MD | Strength in TD | | Modulus in MD | | | |
| | I | II | III | IV | V | Polyester | Wollastonite | (Kg/cm²) | (Kg/cm²) | MD/TD | (Kg/cm²) | (°C.) | (°C.) | MR |
|---|---|---|---|---|---|---|---|---|---|---|---|---|---|---|
| Example 23 | 60 | 3 | 7 | 10 | 20 | 80 | 20 | 1900 | 1150 | 1.7 | 115000 | 205 | 290 | |
| Example 24 | 60 | 3 | 7 | 10 | 20 | 30 | 70 | 1300 | 1000 | 1.3 | 170000 | 220 | 290 | |
| Comparative Example 15 | 60 | 10 | 2 | 8 | 20 | 60 | 40 | 1700 | 950 | 1.8 | 130000 | 137 | 255 | |
| Comparative Example 16 | 60 | 15 | 5 | — | 20 | 60 | 40 | 1200 | 670 | 1.8 | 90000 | 300 | 400 | |
| Comparative Example 17 | 60 | 10 | — | 10 | 20 | 60 | 40 | 1600 | 890 | 1.8 | 120000 | 150 | 295 | |

Units

I

II

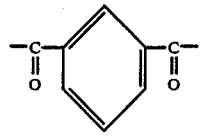

III

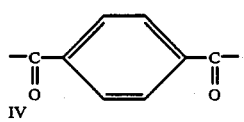

IV

V

EXAMPLE 25

An aromatic polyeser was polymerized by repeating the same procedure as in Example 11 except that the polymerization vessel was charged with 1200 grams (6.66 mol) of p-acetoxybenzoic acid, 60 grams (0.334 mol) of m-acetoxybenzoic acid, 170.4 grams (1.026 mol) of terephthalic acid, 222 grams (1.028 mol) of 2,6-naphthalenedicarboxylic acid, and 555 grams (2.06 mol) of 4,4'-diacetoxybiphenyl. The polyester was blended with glass fibers, molded and then evaluated in the same manner as in Example 11.

The results are shown in Table 9.

EXAMPLE 26

A composition was prepared, molded and evaluated by following the procedure of Example 25 except that the polymerization vessel was charged with 800 grams (4.44 mol) of p-acetoxybenzoic acid, 60 grams (0.334 mol) of m-acetoxybenzoic acid, 262.5 grams (1.58 mol) of terephthalic acid, 342 grams (1.58 mol) of 2,6-naphthalenedicarboxylic acid, and 855 grams (3.17 mol) of 4,4'-diacetoxybiphenyl.

The results are shown in Table 9.

EXAMPLE 27

A composition was prepared, molded and evaluated by following the procedure of Example 25 except that the polymerization vessel was charged with 1300 grams (7.215 mol) of p-acetoxybenzoic acid, 60 grams (0.334 mol) of m-acetoxybenzoic acid, 147.4 grams (0.887 mol) of terephthalic acid, 192 grams (0.889 mol) of 2,6-naphthalenedicarboxylic acid, and 480 grams (1.778 mol) of 4,4'-diacetoxybiphenyl.

The results are shown in Table 9.

EXAMPLE 28

A composition was prepared, molded and evaluated by following the procedure of Example 25 except that the polymerization vessel was charged with 1300 grams (7.215 mol) of p-acetoxybenzoic acid, 65 grams (0.361 mol) of m-acetoxybenzoic acid, 73.9 grams (0.445 mol) of terephthalic acid, 384.5 grams (1.78 mol) of 2,6-naphthalenedicarboxylic acid, and 600.8 grams (2.225 mol) of 4,4'-diacetoxybiphenyl.

The results are shown in Table 9.

EXAMPLE 29

A composition was prepared, molded and evaluated by following the procedure of Example 25 except that the polymerization vessel was charged with 1300 grams (7.215 mol) of p-acetoxybenzoic acid, 65 grams (0.361 mol) of m-acetoxybenzoic acid, 249.5 grams (1.503 mol) of terephthalic acid, 156 grams (0.722 mol) of 2,6-naphthalenedicarboxylic acid, and 600.8 grams (2.225 mol) of 4,4'-diacetoxybiphenyl.

The results are shown in Table 9.

EXAMPLES 30–31

The same aromatic polyester as used in Example 25 was blended with glass fibers in a ratio shown in Table 9, milled, molded, and evaluated in the same manner as in Example 25.

The results are shown in Table 9.

EXAMPLE 32

The same aromatic polyester as used in Example 25 was blended with wollastonite (Hayashi Chemicals K.K., UM-8N) in a weight ratio of 6:4, milled, molded, and evaluated in the same manner as in Example 11.

The results are shown in Table 10.

EXAMPLE 33

The same aromatic polyester as used in Example 26 was blended with wollastonite (UM-8N) in a weight ratio of 6:4, milled, molded, and evaluated in the same manner as in Example 11.

The results are shown in Table 10.

EXAMPLES 34–36

The same aromatic polyesters as used in Examples 27–29 were blended with wollastonite (UM-8N) in a weight ratio of 6:4, milled, molded, and evaluated in the same manner as in Example 11.

The results are shown in Table 10.

EXAMPLES 37–38

The same aromatic polyester as used in Example 25 was blended with wollastonite in a ratio shown in Table 10, milled, molded, and evaluated in the same manner as in Example 25.

The results are shown in Table 10.

COMPARATIVE EXAMPLES 18–22

For comparison purposes, polyesters having a composition outside the scope of the present invention as shown in Table 9 were synthesized as Comparative Examples 18 and 19. Known polyesters of U.S. Pat. Nos. 4,083,829, 4,169,933, and 4,130,545 were synthesized as Comparative Examples 20, 21 and 22. These polyesters were blended with glass fibers, milled, molded, and evaluated in the same manner as in Example 25.

The results are shown in Table 9.

COMPARATIVE EXAMPLE 23

The same aromatic polyester as used in Example 25 was molded without an inorganic filler and evaluated in the same manner as in Example 25.

The results are shown in Table 9.

COMPARATIVE EXAMPLES 24–28

The same aromatic polyesters as used in Comparative Examples 18–22 were blended with wollastonite, milled, molded and evaluated in the same manner as in Example 32.

The results are shown in Table 10.

TABLE 9

| | Resin units (mol %) | | | | | Composition (wt %) | | Bend test | | | | HDT (°C.) | IMT (°C.) | MR |
| | I | II | III | IV | V | Polyester | Glass fiber | Strength in MD (Kg/cm$^2$) | Strength in TD (Kg/cm$^2$) | MD/TD | Modulus in MD (Kg/cm$^2$) | | | |
| --- | --- | --- | --- | --- | --- | --- | --- | --- | --- | --- | --- | --- | --- | --- |
| Example 25 | 60 | 3 | 9.25 | 9.25 | 18.5 | 70 | 30 | 2600 | 1450 | 1.8 | 150000 | 240 | 295 | |
| Example 26 | 40 | 3 | 14.25 | 14.25 | 28.5 | 70 | 30 | 2250 | 1320 | 1.7 | 140000 | 230 | 275 | |
| Example 27 | 65 | 3 | 8.0 | 8.0 | 16.0 | 70 | 30 | 2500 | 1470 | 1.7 | 155000 | 245 | 300 | |
| Example 28 | 60 | 3 | 3.7 | 14.8 | 18.5 | 70 | 30 | 2550 | 1450 | 1.8 | 150000 | 255 | 307 | |
| Example 29 | 60 | 3 | 12.5 | 6.0 | 18.5 | 70 | 30 | 2500 | 1450 | 1.7 | 150000 | 260 | 310 | |
| Example 30 | 60 | 3 | 9.25 | 9.25 | 18.5 | 90 | 10 | 1900 | 1060 | 1.8 | 105000 | 215 | 295 | |
| Example 31 | 60 | 3 | 9.25 | 9.25 | 18.5 | 50 | 50 | 2800 | 1650 | 1.7 | 180000 | 245 | 295 | |
| Comparative Example 18 | 60 | 10 | 7.5 | 7.5 | 15 | 70 | 30 | 1400 | 740 | 1.9 | 110000 | 105 | 285 | |
| Comparative Example 19 | 85 | 3 | 3 | 3 | 6 | 70 | 30 | 600 | 320 | 1.9 | 130000 | 235 | 360 | |
| Comparative Example 20 | 60 | — | *10 | 10 | 20 | 70 | 30 | 2250 | 1180 | 1.9 | 140000 | 162 | 295 | |
| Comparative Example 21 | 60 | — | 10 | 10 | 20 | 70 | 30 | 1900 | 1000 | 1.9 | 120000 | 167 | 275 | |
| Comparative Example 22 | 60 | 10 | — | 10 | 20 | 70 | 30 | 2200 | 1160 | 1.9 | 140000 | 188 | 320 | |
| Comparative | 60 | 3 | 9.25 | 9.25 | 18.5 | 100 | 0 | 1500 | 600 | 2.5 | 83000 | 196 | 295 | X |

TABLE 9-continued

|  | Resin units (mol %) | | | | | Composition (wt %) | | Bend test | | | | | |
|---|---|---|---|---|---|---|---|---|---|---|---|---|---|
|  | | | | | | | | Strength in MD | Strength in TD | | Modulus in MD | HDT | IMT |
|  | I | II | III | IV | V | Polyester | Glass fiber | (Kg/cm²) | (Kg/cm²) | MD/TD | (Kg/cm²) | (°C.) | (°C.) | MR |

Example 23

Units

I: —O—C₆H₄—C(=O)—

II: —O—C₆H₄—C(=O)— (ortho)

III: —C(=O)—C₆H₄—C(=O)—

IV: naphthalene-2,6-dicarbonyl —C(=O)—C₁₀H₆—C(=O)—

V: —O—C₆H₄—C₆H₄—O— (biphenyl)

Unit III with asterisk (*) is isophthalic acid.
Unit III without asterisk (*) is terephthalic acid.

TABLE 10

|  | Resin units (mol %) | | | | | Composition (wt %) | | Bend test | | | | | | |
|---|---|---|---|---|---|---|---|---|---|---|---|---|---|---|
|  | | | | | | | | Strength in MD | Strength in TD | | Modulus in MD | HDT | IMT | |
|  | I | II | III | IV | V | Polyester | Wollastonite | (Kg/cm²) | (Kg/cm²) | MD/TD | (Kg/cm²) | (°C.) | (°C.) | MR |
| Example 32 | 60 | 3 | 9.25 | 9.25 | 18.5 | 60 | 40 | 1800 | 1060 | 1.7 | 140000 | 205 | 295 | |
| Example 33 | 40 | 3 | 14.25 | 14.25 | 28.5 | 60 | 40 | 1600 | 950 | 1.7 | 135000 | 200 | 275 | |
| Example 34 | 65 | 3 | 8.0 | 8.0 | 16.0 | 60 | 40 | 1800 | 1050 | 1.7 | 150000 | 208 | 300 | |
| Example 35 | 60 | 3 | 3.7 | 14.8 | 18.5 | 60 | 40 | 1800 | 1050 | 1.7 | 145000 | 220 | 307 | |
| Example 36 | 60 | 3 | 12.5 | 6.0 | 18.5 | 60 | 40 | 1800 | 1060 | 1.7 | 150000 | 215 | 303 | |
| Example 37 | 60 | 3 | 9.25 | 9.25 | 18.5 | 80 | 20 | 1650 | 970 | 1.7 | 115000 | 200 | 295 | |
| Example 38 | 60 | 3 | 9.25 | 9.25 | 18.5 | 30 | 70 | 1300 | 1000 | 1.7 | 170000 | 210 | 295 | |
| Comparative Example 24 | 60 | 10 | 7.5 | 7.5 | 15 | 60 | 40 | 1100 | 610 | 1.3 | 100000 | 93 | 285 | |
| Comparative Example 25 | 85 | 3 | 3 | 3 | 6 | 60 | 40 | 550 | 310 | 1.8 | 120000 | 220 | 360 | |
| Comparative Example 26 | 60 | — | *10 | 10 | 20 | 60 | 40 | 1600 | 890 | 1.8 | 120000 | 150 | 295 | |
| Comparative Example 27 | 60 | — | 10 | 10 | 20 | 60 | 40 | 1500 | 830 | 1.8 | 110000 | 155 | 275 | |
| Comparative | 60 | 10 | — | 10 | 20 | 60 | 40 | 1550 | 860 | 1.8 | 130000 | 175 | 320 | |

TABLE 10-continued

|  | Resin units (mol %) | | | | | Composition (wt %) | | Bend test | | | | | |
|---|---|---|---|---|---|---|---|---|---|---|---|---|---|
|  | | | | | | | | Strength in MD | Strength in TD | | Modulus in MD | HDT | IMT |
|  | I | II | III | IV | V | Polyester | Wollastonite | (Kg/cm$^2$) | (Kg/cm$^2$) | MD/TD | (Kg/cm$^2$) | (°C.) | (°C.) | MR |

Example 28
Units

I $-O-\phantom{x}\bigcirc\phantom{x}-\overset{\text{O}}{\underset{\|}{C}}-$

II $-O-\phantom{x}\bigcirc\phantom{x}-\overset{\text{O}}{\underset{\|}{C}}-$

III $-\overset{\text{O}}{\underset{\|}{C}}-\phantom{x}\bigcirc\phantom{x}-\overset{\text{O}}{\underset{\|}{C}}-$

IV $-\overset{\text{O}}{\underset{\|}{C}}-\phantom{x}\bigcirc\bigcirc\phantom{x}-\overset{\text{O}}{\underset{\|}{C}}-$

V $-O-\phantom{x}\bigcirc-\bigcirc\phantom{x}-O-$

Unit III with asterisk (*) is isophthalic acid.
Unit III without asterisk (*) is terephthalic acid.

[4] Examples of the aromatic polyesteramide composition according to the fourth aspect of the present invention are presented along with comparative examples.

EXAMPLE 39

A polymerization vessel equipped with an agitator with a torque meter and a revolution meter, an argon inlet tube, and a thermometer was charged with 1642 grams (9.12 mol) of p-acetoxybenzoic acid, 80 grams (0.48 mol) of isophthalic acid, 186 grams (1.12 mol) of terephthalic acid, 346 grams (1.6 mol) of 2,6-naphthalenedicarboxylic acid, 864 grams (3.2 mol) of 4,4'-diacetoxybiphenyl, and 86 grams (0.48 mol) of p-acetamidobenzoic acid.

The interior of the vessel was fully replaced by argon and then heated up to a temperature of 260° C. over a period of about 30 minutes. After the contents were melted during the temperature rise, agitation was started. Distillation of acetic acid started at a temperature of approximately 230° C. Polymerization was carried out for 1 hour at 260° C., another 1 hour at 280° C. and a further 1 hour at 300° C. Then the pressure was gradually reduced. Finally, polymerization was continued at 320° C. and 0.5 mmHg until the agitator reached a predetermined torque.

The resulting block-shaped polyesteramide was comminuted and melt blended with glass fibers having an average diameter of 11 μm and a length of 3 mm at a weight ratio of resin to fibers of 7:3 in an extruder with a die having a diameter of 20 mm. The blend was injection molded and evaluated for physical properties.

The results are shown in Table 11.

EXAMPLE 40

A resin was synthesized, blended with glass fibers, injection molded, and evaluated by following the same procedure as in Example 39 except that the weight ratio of resin to glass fibers was changed to 9:1.

The results are shown in Table 11.

EXAMPLE 41

A resin was synthesized, blended with glass fibers, injection molded, and evaluated by following the same procedure as in Example 39 except that the weight ratio of resin to glass fibers was changed to 5:5.

The results are shown in Table 11.

EXAMPLE 42

A resin was synthesized by the same procedure as in Example 39 except that the vessel was charged with 1728 grams (9.6 mol) of p-acetoxybenzoic acid, 86.4 grams (0.48 mol) of m-acetoxybenzoic acid, 246 grams (1.48 mol) of terephthalic acid, 320 grams (1.48 mol) of 2,6-naphthalenedicarboxylic acid, 583 grams (2.16 mol) of 4,4'-diacetoxybiphenyl, and 154 grams (0.8 mol) of 4-acetoxyacetanilide.

The resulting polyesteramide was comminuted and melt blended with wollastonite at a weight ratio of resin to wollastonite of 6:4 in an extruder with a die having a diameter of 20 mm. The blend was injection molded and evaluated for physical properties.

The results are shown in Table 11.

EXAMPLES 43-44

The same aromatic polyesteramide as used in Example 42 was melt blended with wollastonite at a weight ratio of resin to wollastonite of 8:2 and 3:7 in an extruder with a die having a diameter of 20 mm. The blends were injection molded and evaluated for physical properties.

The results are shown in Table 11.

COMPARATIVE EXAMPLE 29

The same aromatic polyesteramide as used in Example 39 was evaluated without glass fibers.

The results are shown in Table 11.

COMPARATIVE EXAMPLE 30

The same aromatic polyesteramide as used in Example 42 was evaluated without wollastonite.

The results are shown in Table 11.

sel was fully replaced by argon and then heated up to a temperature of 250° C. over a period of about 30 minutes. After the contents were melted, agitation was started.

After acetic acid started distilling out, the temperature was raised to 280° C. over 10 minutes, maintained at the temperature for 30 minutes, again raised to 300° C. over 10 minutes, and maintained at the temperature for 30 minutes.

The temperature was raised to 310° C. over 10 minutes, and then the pressure was gradually reduced eventually to 1 mmHg over a period of about 20 minutes. Polymerization was continued under these conditions until the agitator reached a predetermined torque at a predetermined rpm.

The resulting aromatic polyester was solidified, comminuted, and blended with Ba-ferrite TR-M (manufactured by Tone Sangyo K.K.) in a weight ratio of resin to ferrite of 1:9 in an extruder with a die having a diameter of 20 mm (manufactured by Thermo-Plastic Kogyo K.K.), pelletized, and then injection molded into specimens which were measured for physical properties.

The results are shown in Table 12.

TABLE 11

| | Polyester | Inorganic fillers | Composition (wt %) | | Bend test | | | | HDT (°C.) | IMT (°C.) | MR |
| | | | Resin | Inorganic fillers | Strength in MD (kg/cm$^2$) | Strength in TD (Kg/cm$^2$) | MD/TD | Modulus in MD (Kg/cm$^2$) | | | |
|---|---|---|---|---|---|---|---|---|---|---|---|
| Example 39 | (a) | Glass fiber | 70 | 30 | 2700 | 1800 | 1.5 | 160000 | 240 | 290 | |
| Example 40 | (a) | Glass fiber | 90 | 10 | 1950 | 1030 | 1.9 | 110000 | 215 | 290 | |
| Example 41 | (a) | Glass fiber | 50 | 50 | 2900 | 1700 | 1.7 | 185000 | 245 | 290 | |
| Example 42 | (b) | Wollastonite | 60 | 40 | 1850 | 1230 | 1.5 | 150000 | 195 | 295 | |
| Example 43 | (b) | Wollastonite | 80 | 20 | 1700 | 1060 | 1.6 | 120000 | 190 | 295 | |
| Example 44 | (b) | Wollastonite | 30 | 70 | 1350 | 900 | 1.5 | 175000 | 200 | 295 | |
| Comparative Example 29 | (a) | — | 100 | 0 | 1590 | 740 | 2.1 | 95000 | 192 | 290 | X |
| Comparative Example 30 | (b) | — | 100 | 0 | 1600 | 790 | 2.0 | 95000 | 184 | 295 | X |

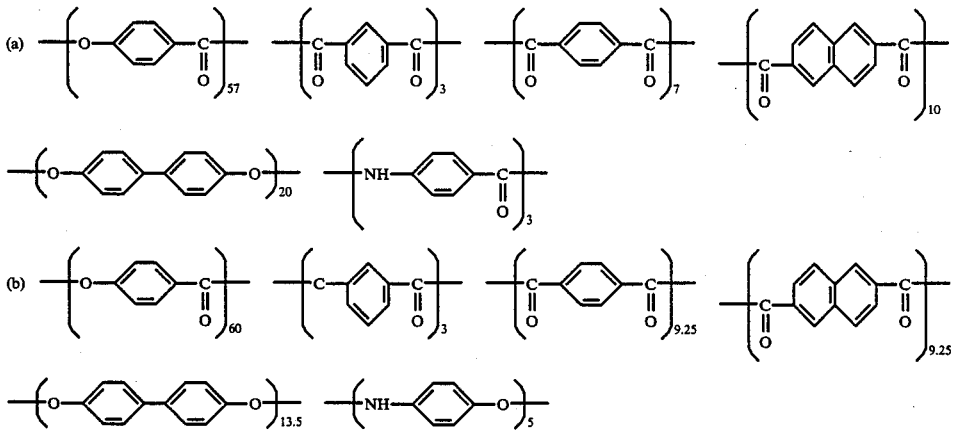

[5] Examples of the magnetic polyester composition according to the fifth aspect of the present invention are presented along with comparative examples.

EXAMPLE 45

A 5-liter glass reaction vessel equipped with an agitator with a torque meter and a revolution meter, an argon inlet tube, and a thermometer was charged with 1200 grams (6.66 mol) of p-acetoxybenzoic acid, 55.4 grams (0.334 mol) of isophthalic acid, 129 grams (0.778 mol) of terephthalic acid, 240 grams (1.112 mol) of 2,6-naphthalenedicarboxylic acid, and 600 grams (2.22 mol) of 4,4'-diacetoxybiphenyl. The interior of the ves-

EXAMPLE 46

An aromatic polyester was synthesized by the same procedure as in Example 45 except that the vessel was charged with 800 grams (4.44 mol) of p-acetoxybenzoic acid, 55.4 grams (0.334 mol) of isophthalic acid, 248.7 grams (1.5 mol) of terephthalic acid, 323.7 grams (1.5 mol) of 2,6-naphthalenedicarboxylic acid, and 900 grams (3.33 mol) of 4,4'-diacetoxybiphenyl. The resulting aromatic polyester was blended and milled with the same barium ferrite in the same ratio, molded and evaluated in the same manner as in Example 45.

The results are shown in Table 12.

EXAMPLE 47

An aromatic polyester was synthesized by the same procedure as in Example 45 except that the vessel was charged with 1300 grams (7.215 mol) of p-acetoxybenzoic acid, 55.4 grams (0.334 mol) of isophthalic acid, 133.8 grams (0.806 mol) of terephthalic acid, 174 grams (0.806 mol) of 2,6-naphthalenedicarboxylic acid, and 525 grams (1.943 mol) of 4,4'-diacetoxybiphenyl. The resulting aromatic polyester was blended and milled with the same barium ferrite in the same ratio, molded and evaluated in the same manenr as in Example 45.

The results are shown in Table 12.

EXAMPLE 48

An aromatic polyester was synthesized by the same procedure as in Example 45 except that the polymerization vessel was charged with 1300 grams (7.215 mol) of p-acetoxybenzoic acid, 59.9 grams (0.361 mol) of isophthalic acid, 67.9 grams (0.409 mol) of terephthalic acid, 353.2 grams (1.635 mol) of 2,6-naphthalenedicarboxylic acid, and 649.4 grams (2.405 mol) of 4,4'-diacetoxybiphenyl. The resulting aromatic polyester was blended and milled with the same barium ferrite in the same ratio, molded and evaluated in the same manner as in Example 45.

The results are shown in Table 12.

EXAMPLE 49

An aromatic polyester was synthesized by the same procedure as in Example 45 except that the polymerization vessel was charged with 1300 grams (7.215 mol) of p-acetoxybenzoic acid, 59.9 grams (0.361 mol) of isophthalic acid, 219.6 grams (1.323 mol) of terephthalic acid, 156 grams (0.722 mol) of 2,6-naphthalenedicarboxylic acid, and 649.4 grams (2.405 mol) of 4,4'-diacetoxybiphenyl. The resulting aromatic polyester was blended and milled with the same barium ferrite in the same ratio, molded and evaluated in the same manner as in Example 45.

The results are shown in Table 12.

EXAMPLES 50-52

The same aromatic polyesters as synthesized in Examples 45-47 were blended and milled with the same barium ferrite as used in Example 45, but in a ratio of 3:17, and then molded and evaluated in the same manner as in Example 45.

The results are shown in Table 12.

COMPARATIVE EXAMPLE 31

For comparison purpose, nylon-6, A 1022LP (manufactured by Sekisui Plastics Co., Ltd.) was blended and milled with barium ferrite in a weight ratio of 1:9, pelletized, injection molded, and evaluated for physical properties in the same manner as in Example 45.

The results are shown in Table 12.

COMPARATIVE EXAMPLES 32-33

Polyesters having the compositions shown in the footnote of Table 12 were prepared, and then blended and milled with the same barium ferrite in the same ratio, molded and evaluated in the same manner as in Example 45.

The results are shown in Table 12.

COMPARATIVE EXAMPLES 34-36

The same aromatic polyesters as used in Comparative Examples 31-33 were blended and milled with the same barium ferrite in a weight ratio of 3:17 as in Comparative Examples 31-33, and then molded and evaluated in the same manner as in Example 45.

The results are shown in Table 12.

TABLE 12

| | Resin units (1) (mol %) | | | | | Resin/ferrite | | | (BH)max | FS | IMT | HDT |
|---|---|---|---|---|---|---|---|---|---|---|---|---|
| | I | II | III | IV | V | (weight ratio) | Br(G) | Hc(Oe) | (MGOe) | (Kg/cm$^2$) | (°C.) | (°C.) |
| Example 45 | 60 | 3 | 7 | 10 | 20 | 1:9 | 2050 | 2000 | 1.2 | 1050 | 300 | 240 |
| Example 46 | 40 | 3 | 13.5 | 13.5 | 30 | 1:9 | 2050 | 2000 | 1.2 | 1030 | 290 | 230 |
| Example 47 | 65 | 3 | 7.25 | 7.25 | 17.5 | 1:9 | 2050 | 2000 | 1.2 | 1060 | 320 | 250 |
| Example 48 | 60 | 3 | 3.4 | 13.6 | 20 | 1:9 | 2050 | 2000 | 1.2 | 1060 | 300 | 240 |
| Example 49 | 60 | 3 | 11 | 6 | 20 | 1:9 | 2050 | 2000 | 1.2 | 1060 | 307 | 245 |
| Example 50 | 60 | 3 | 7 | 10 | 20 | 3:17 | 1940 | 1890 | 1.1 | 1100 | 300 | 240 |
| Example 51 | 40 | 3 | 13.5 | 13.5 | 30 | 3:17 | 1940 | 1890 | 1.1 | 1090 | 290 | 230 |
| Example 52 | 65 | 3 | 7.25 | 7.25 | 17.5 | 3:17 | 1940 | 1890 | 1.1 | 1120 | 320 | 250 |
| Comparative Example 31 | nylon-6 | | | | | 1:9 | 2050 | 2000 | 1.2 | 900 | 290 | 150 |
| Comparative Example 32 | (2) | | | | | 1:9 | 2050 | 2000 | 1.2 | 760 | 260 | 152 |
| Comparative Example 33 | (3) | | | | | 1:9 | 2050 | 2000 | 1.2 | 730 | 400 | 300 |
| Comparative Example 34 | nylon-6 | | | | | 3:17 | 1940 | 1890 | 1.1 | 920 | 290 | 150 |
| Comparative Example 35 | (2) | | | | | 3:17 | 1940 | 1890 | 1.1 | 780 | 260 | 150 |
| Comparative Example 36 | (3) | | | | | 3:17 | 1940 | 1890 | 1.1 | 740 | 400 | 300 |

TABLE 12-continued

| | Resin units (1) (mol %) | | | | Resin/ferrite | | | (BH)max | FS | IMT | HDT |
|---|---|---|---|---|---|---|---|---|---|---|---|
| | I | II | III | IV | V | (weight ratio) | Br(G) | Hc(Oe) | (MGOe) | (Kg/cm$^2$) | (°C.) | (°C.) |

Example 36

(1) Units

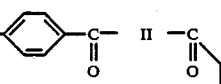    V Examples 45–52

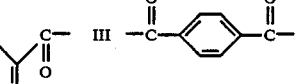

(2) Polyester used in Comparative Examples 32, 35

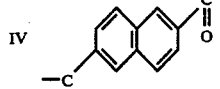

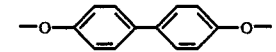

(3) Polyester used in Comparative Examples 33, 36

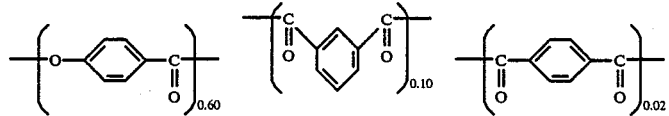

EXAMPLE 53

An aromatic polyester was polymerized by repeating the same procedure as in Example 45 except that the polymerization vessel was charged with 1200 grams (6.66 mol) of p-acetoxybenzoic acid, 60 grams (0.334 mol) of m-acetoxybenzoic acid, 170.4 grams (1.026 mol) of terephthalic acid, 222 grams (1.028 mol) of 2,6-naphthalenedicarboxylic acid, and 555 grams (2.056 mol) of 4,4'-diacetoxybiphenyl. The resulting polyester was blended with barium ferrite, and then molded and evaluated in the same manner as in Example 45.

The results are shown in Table 13.

EXAMPLE 54

A ferrite-filled polyester composition was prepared, molded and evaluated by following the procedure of Example 45 except that the polymerization vessel was charged with 800 grams (4.44 mol) of p-acetoxybenzoic acid, 60 grams (0.334 mol) of m-acetoxybenzoic acid, 262.5 grams (1.58 mol) of terephthalic acid, 342 grams (1.58 mol) of 2,6-naphthalenedicarboxylic acid, and 855 grams (3.17 mol) of 4,4'-diacetoxybiphenyl.

The results are shown in Table 13.

EXAMPLE 55

A ferrite-filled polyester composition was prepared, molded and evaluated by following the procedure of Example 45 except that the polymerization vessel was charged with 1300 grams (7.215 mol) of p-acetoxybenzoic acid, 60 grams (0.334 mol) of m-acetoxybenzoic acid, 147.4 grams (0.887 mol) of terephthalic acid, 192 grams (0.889 mol) of 2,6-naphthalenedicarboxylic acid, and 480 grams (1.778 mol) of 4,4'-diacetoxybiphenyl.

The results are shown in Table 13.

EXAMPLE 56

A ferrite-filled polyester composition was prepared, molded and evaluated by following the procedure of Example 45 except that the vessel was charged with 1300 grams (7.215 mol) of p-acetoxybenzoic acid, 65 grams (0.361 mol) of m-acetoxybenzoic acid, 73.9 grams (0.445 mol) of terephthalic acid, 384.5 grams (1.78 mol) of 2,6-naphthalenedicarboxylic acid, and 600.8 grams (2.225 mol) of 4,4'-diacetoxybiphenyl.

The results are shown in Table 13.

EXAMPLE 57

A ferrite-filled polyester composition was prepared, molded and evaluated by following the procedure of Example 45 except that the vessel was charged with 1300 grams (7.215 mol) of p-acetoxybenzoic acid, 65 grams (0.361 mol) of m-acetoxybenzoic acid, 249.5 grams (1.503 mol) of terephthalic acid, 156 grams (0.722 mol) of 2,6-naphthalenedicarboxylic acid, and 600.8 grams (2.225 mol) of 4,4'-diacetoxybiphenyl.

The results are shown in Table 13.

EXAMPLES 58–60

The same aromatic polyesters as synthesized in Examples 53–55 were blended with barium ferrite in a weight ratio of 3:17, milled, molded, and evaluated in the same manner as in Example 45.

The results are shown in Table 13.

COMPARATIVE EXAMPLES 37-38

For comparison purpose, polyesters having the composition shown in Table 13 were synthesized. The resulting polyesters were blended with the same barium ferrite in the same ratio, milled, molded, and evaluated in the same manner as in Example 53.

The results are shown in Table 13.

COMPARATIVE EXAMPLES 39-41

The same polymers as used in Comparative Examples 31, 37 and 38 were blended with the same barium ferrite as used in Comparative Examples 31, 37 and 38 in a weight ratio of 3:17, milled, molded, and evaluated in the same manner as in Example 53.

The results are shown in Table 13.

[6] Examples of the magnetic polyesteramide composition according to the sixth aspect of the present invention are presented along with comparative examples.

EXAMPLE 61

A 5-liter glass reaction vessel equipped with an agitator with a torque meter and a revolution meter, an argon inlet tube, and a thermometer was charged with 1642 grams (9.12 mol) of p-acetoxybenzoic acid, 80 grams (0.48 mol) of isophthalic acid, 186 grams (1.12 mol) of terephthalic acid, 346 grams (1.6 mol) of 2,6-naphthalenedicarboxylic acid, 864 grams (3.2 mol) of 4,4'-diacetoxybiphenyl, and 86 grams (0.48 mol) of p-acetamidobenzoic acid.

The interior of the vessel was fully replaced by argon and then heated up to a temperature of 250° C. over a

TABLE 13

| | Resin units (1) (mol %) | | | | | Resin/ferrite | | | (BH)max | FS | IMT | HDT |
|---|---|---|---|---|---|---|---|---|---|---|---|---|
| | I | II | III | IV | V | (weight ratio) | Br(G) | Hc(Oe) | (MGOe) | (Kg/cm$^2$) | (°C.) | (°C.) |
| Example 53 | 60 | 3 | 9.25 | 9.25 | 18.5 | 1:9 | 2050 | 2000 | 1.2 | 1050 | 300 | 240 |
| Example 54 | 40 | 3 | 4.25 | 14.25 | 28.5 | 1:9 | 2050 | 2000 | 1.2 | 1030 | 280 | 230 |
| Example 55 | 65 | 3 | 8.0 | 8.0 | 16.0 | 1:9 | 2050 | 2000 | 1.2 | 1060 | 300 | 240 |
| Example 56 | 60 | 3 | 3.7 | 14.8 | 18.5 | 1:9 | 2050 | 2000 | 1.2 | 1050 | 305 | 250 |
| Example 57 | 60 | 3 | 12.5 | 6.0 | 18.5 | 1:9 | 2050 | 2000 | 1.2 | 1060 | 302 | 245 |
| Example 58 | 60 | 3 | 9.25 | 9.25 | 18.5 | 3:17 | 1940 | 1890 | 1.1 | 1100 | 300 | 240 |
| Example 59 | 40 | 3 | 4.25 | 14.25 | 28.5 | 3:17 | 1940 | 1890 | 1.1 | 1090 | 280 | 230 |
| Example 60 | 65 | 3 | 8.0 | 8.0 | 16.0 | 3:17 | 1940 | 1890 | 1.1 | 1120 | 300 | 240 |
| Comparative Example 31 | nylon-6 | | | | | 1:9 | 2050 | 2000 | 1.2 | 900 | 290 | 150 |
| Comparative Example 37 | (2) | | | | | 1:9 | 2050 | 2000 | 1.2 | 760 | 290 | 110 |
| Comparative Example 38 | (3) | | | | | 1:9 | 2050 | 2000 | 1.2 | 730 | 295 | 172 |
| Comparative Example 39 | nylon-6 | | | | | 3:17 | 1940 | 1890 | 1.1 | 920 | 290 | 150 |
| Comparative Example 40 | (2) | | | | | 3:17 | 1940 | 1890 | 1.1 | 780 | 290 | 110 |
| Comparative Example 41 | (3) | | | | | 3:17 | 1940 | 1890 | 1.1 | 740 | 295 | 172 |

(1) Units

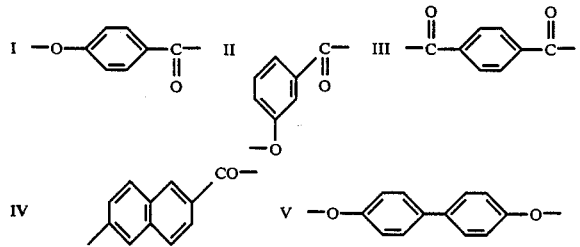

(2) Polyester used in Comparative Examples 37, 40

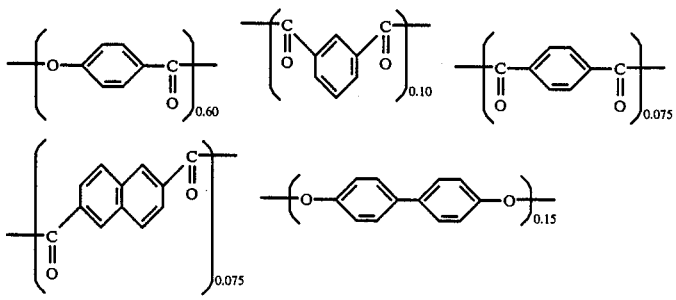

(3) Polyester used in Comparative Examples 38, 41

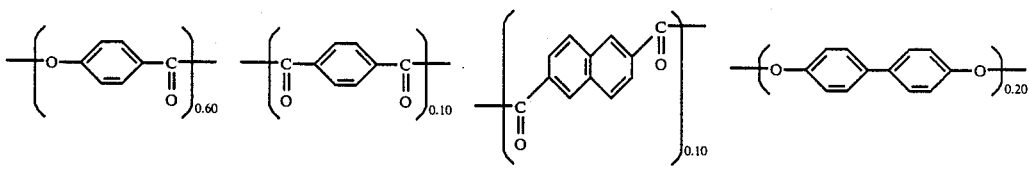

period of about 30 minutes. After the contents were melted during the temperature rise, agitation was started. Distillation of acetic acid started at a temperature of approximately 230° C. Polymerization was carried out for 1 hour at 260° C., another 1 hour at 280° C. and a further 1 hour at 300° C. Then the pressure was gradually reduced. Finally, polymerization was continued at 320° C. and 0.5 mmHg until the agitator reached a predetermined torque.

The resulting polyesteramide was comminuted and melt blended with barium ferrite TR-M (manufactured by Tone Sangyo K.K.) in a weight ratio of resin to ferrite of 1:9, pelletized, and then molded in the same manner as in Example 45 into specimens which were measured for physical properties.

The results are shown in Table 14.

EXAMPLE 62

A resin was synthesized by the same procedure as in Example 61 except that the vessel was charged with 1728 grams (9.6 mol) of p-acetoxybenzoic acid, 86.4 grams (0.48 mol) of m-acetoxybenzoic acid, 246 grams (1.48 mol) of terephthalic acid, 320 grams (1.48 mol) of 2,6-naphthalenedicarboxylic acid, 583 grams (2.16 mol) of 4,4'-diacetoxybiphenyl, and 154 grams (0.8 mol) of 4-acetoxyacetanilide.

The resulting polyesteramide was comminuted and melt blended with barium ferrite TR-M in a weight ratio of resin to ferrite of 1:9, pelletized, molded and evaluated in the same manner as in Example 45.

The results are shown in Table 14.

EXAMPLE 63

A resin was synthesized, blended with ferrite, pelletized, injection molded, and evaluated by the same procedures as in Example 61 except that the weight ratio of resin to ferrite was 15/85.

The results are shown in Table 14.

EXAMPLE 64

A resin was synthesized, blended with ferrite, pelletized, injection molded, and evaluated by the same procedures as in Example 62 except that the weight ratio of resin to ferrite was 15/85.

The results are shown in Table 14.

TABLE 14

| Example No. | Resin | Composition (wt %) Resin | ferrite | Br(G) | HC(Oe) | (BH)max (MGOe) | FS (kg/cm$^2$) | IMT (°C.) | HDT (°C.) |
|---|---|---|---|---|---|---|---|---|---|
| Example 61 | (a) | 10 | 90 | 2050 | 2000 | 1.2 | 1120 | 285 | 215 |
| Example 62 | (b) | 10 | 90 | 2050 | 2000 | 1.2 | 1130 | 300 | 205 |
| Example 63 | (a) | 15 | 85 | 1940 | 1890 | 1.1 | 1150 | 285 | 215 |
| Example 64 | (b) | 15 | 85 | 1940 | 1890 | 1.1 | 1170 | 300 | 205 |

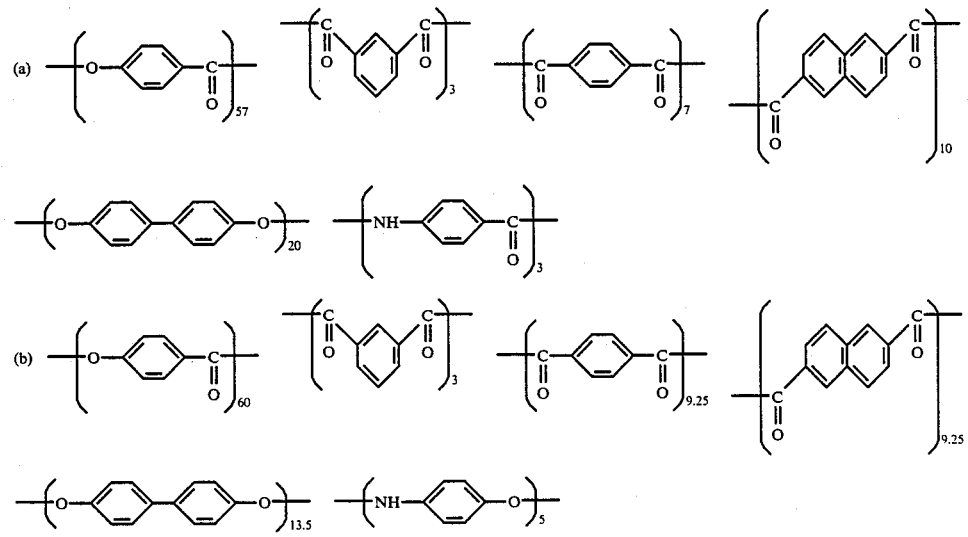

We claim:

1. An aromatic polyesteramide consisting essentially of units I, II, III, IV, V, and VI of the following formulae:

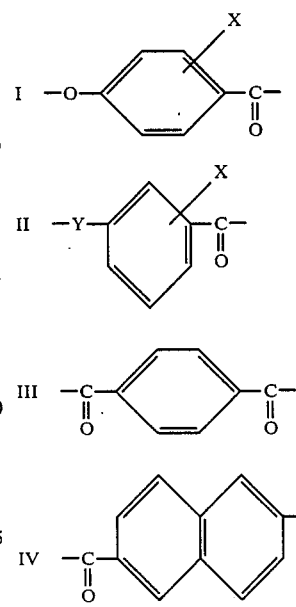

V is 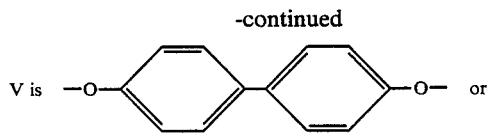 or

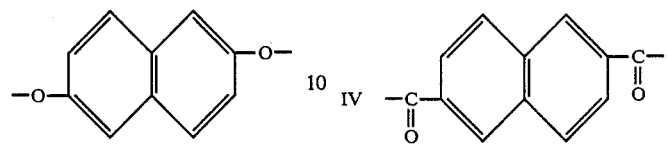

VI 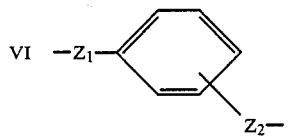

wherein
X is a radical selected from the group consisting of a hydrogen atom, a halogen atom, an alkyl radical having 1 to 4 carbon atoms, an alkoxy radical having 1 to 4 carbon atoms, and an aryl radical having 6 to 10 carbon atoms, Y is —O— or

$Z_1$ is —NH—, and
$Z_2$ is —NH—, —O— or

$Z_1$ and $Z_2$ are in para or meta relation to each other, in the following molar amounts:

| unit I | 40 to 70 mol %, |
|---|---|
| unit II | 2 to 5 mol %, |
| units III + IV | 6 to 36 mol %, |
| unit V | 10 to 40 mol %, |
| unit VI | 0.1 to less than 5 mol %, | with the molar ratio of unit III/(units III+IV) ranging from 1/10 to 8/10.

2. An aromatic polyesteramide composition comprising 100 parts by weight of an aromatic polyesteramide consisting essentially of units I, II, III, IV, V, and VI of the following formulae:

I 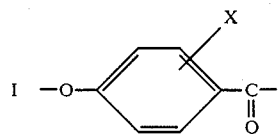

II 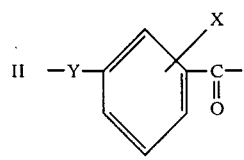

III 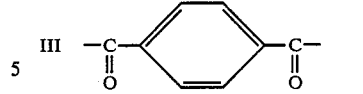

IV 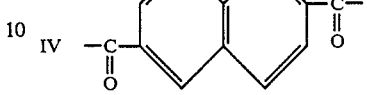

V is 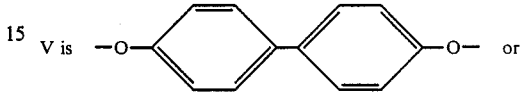 or

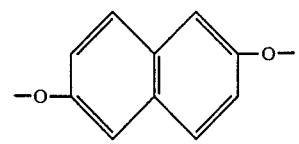

VI 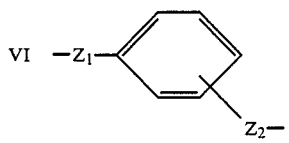

wherein
X is a radical selected from the group consisting of a hydrogen atom, a halogen atom, an alkyl radical having 1 to 4 carbon atoms, an alkoxy radical having 1 to 4 carbon atoms, and an aryl radical having 6 to 10 carbon atoms, Y is —O— or

$Z_1$ is —NH—, and
$Z_2$ is —NH—, —O— or

$Z_1$ and $Z_2$ are in para or meta relation to each other, in the following molar amounts:

| unit I | 40 to 70 mol %, |
|---|---|
| unit II | 2 to 5 mol %, |
| units III + IV | 6 to 36 mol %, |
| unit V | 10 to 40 mol %, |
| unit VI | 0.1 to less than 5 mol %, | with the molar ratio of unit III/(units III+IV) ranging from 1/10 to 8/10, and
1 to 400 parts by weight of an inorganic filler.

3. A composition as defined in claim 2, wherein said inorganic filler is glass fiber.

4. A composition as defined in claim 2, wherein said inorganic filler is wollastonite.

5. A magnetic resin composition comprising 100 parts by weight of an aromatic polyesteramide consisting essentially of units I, II, III, IV, V, and VI of the following formulae:

I 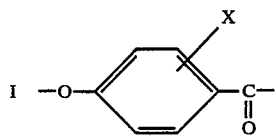

II 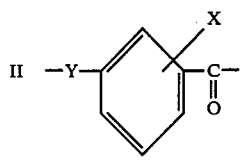

III 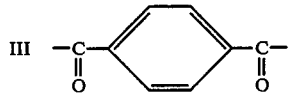

IV 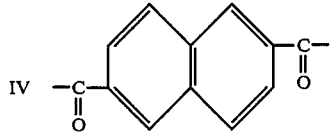

V is 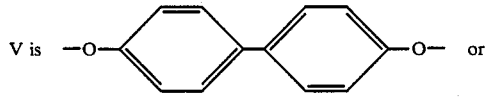 or

VI 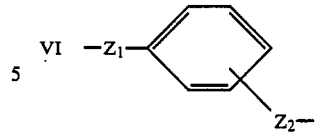

wherein
X is a radical selected from the group consisting of a hydrogen atom, a halogen atom, an alkyl radical having 1 to 4 carbon atoms, an alkoxy radical having 1 to 4 carbon atoms, and an aryl radical having 6 to 10 carbon atoms,
Y is —O— or

$Z_1$ is —NH—, and
$Z_2$ is —NH—, —O— or

$Z_1$ and $Z_2$ are in para or meta relation to each other, in the following molar amounts:

| | |
|---|---|
| unit I | 40 to 70 mol %, |
| unit II | 2 to 5 mol %, |
| units III + IV | 6 to 36 mol %, |
| unit V | 10 to 40 mol %, |
| unit VI | 0.1 to less than 5 mol %, | with the molar ratio of unit III/(units III+IV) ranging from 1/10 to 8/10, and
100 to 1900 parts by weight of a magnetic powder.

6. A composition as defined in claim 5, wherein said magnetic powder is Ba-ferrite.

* * * * *